(12) United States Patent
Odom et al.

(10) Patent No.: US 8,375,455 B2
(45) Date of Patent: Feb. 12, 2013

(54) SYSTEM, METHOD, AND DEVICE FOR STORING AND DELIVERING DATA

(76) Inventors: Wayne Odom, Tucson, AZ (US); Karolyn Gee, Tucson, AZ (US)

( * ) Notice: Subject to any disclaimer, the term of this patent is extended or adjusted under 35 U.S.C. 154(b) by 0 days.

(21) Appl. No.: 13/441,675

(22) Filed: Apr. 6, 2012

(65) Prior Publication Data

US 2012/0192274 A1 Jul. 26, 2012

Related U.S. Application Data

(63) Continuation-in-part of application No. 11/788,602, filed on Apr. 19, 2007, which is a continuation-in-part of application No. 11/519,161, filed on Sep. 11, 2006, which is a continuation-in-part of application No. 11/503,321, filed on Aug. 10, 2006.

(51) Int. Cl.
G06F 21/00 (2006.01)

(52) U.S. Cl. ........................................................ 726/27

(58) Field of Classification Search ............... 726/22–27, 726/29, 30
See application file for complete search history.

(56) References Cited

U.S. PATENT DOCUMENTS

| | | | |
|---|---|---|---|
| 4,278,837 A | 7/1981 | Best | |
| 5,117,380 A | 5/1992 | Tanagawa | |
| 5,178,389 A | 1/1993 | Bentley et al. | |
| 5,184,830 A | 2/1993 | Okada et al. | |
| 6,135,887 A | 10/2000 | Pease et al. | |
| 6,190,257 B1 * | 2/2001 | Takeda et al. | 463/29 |
| 6,251,014 B1 | 6/2001 | Stockdale et al. | |
| 6,330,670 B1 * | 12/2001 | England et al. | 713/2 |
| 6,339,815 B1 | 1/2002 | Feng et al. | |
| 6,369,827 B1 | 4/2002 | Pan et al. | |
| 7,103,718 B2 | 9/2006 | Nickel et al. | |
| 7,233,890 B2 | 6/2007 | Shapiro et al. | |
| 7,278,031 B1 * | 10/2007 | Best | 713/193 |
| 7,308,567 B2 | 12/2007 | Yamamoto et al. | |
| 7,581,256 B2 * | 8/2009 | Cockerille et al. | 726/30 |
| 2001/0029205 A1 | 10/2001 | Taho et al. | |
| 2002/0028710 A1 | 3/2002 | Ishihara et al. | |
| 2002/0183119 A1 | 12/2002 | Fessler | |
| 2003/0050116 A1 | 3/2003 | Chen | |
| 2003/0064771 A1 | 4/2003 | Morrow et al. | |
| 2003/0195737 A1 | 10/2003 | Shapiro et al. | |
| 2003/0220141 A1 | 11/2003 | Corrigan et al. | |
| 2004/0153595 A1 | 8/2004 | Sukegawa et al. | |
| 2004/0242333 A1 | 12/2004 | Arakawa et al. | |
| 2005/0059482 A1 | 3/2005 | Hedrick et al. | |
| 2005/0081064 A1 | 4/2005 | Ooi et al. | |
| 2005/0107149 A1 | 5/2005 | Benbrahim et al. | |
| 2005/0130728 A1 | 6/2005 | Nguyen et al. | |
| 2005/0143456 A1 | 6/2005 | Defossa et al. | |
| 2005/0164789 A1 | 7/2005 | Nakamura et al. | |
| 2005/0181877 A1 | 8/2005 | Kuwahara et al. | |
| 2005/0216639 A1 | 9/2005 | Sparer et al. | |
| 2005/0240918 A1 | 10/2005 | Shlomai | |
| 2005/0282627 A1 | 12/2005 | Hedrick et al. | |
| 2006/0035707 A1 | 2/2006 | Nguyen et al. | |
| 2006/0047880 A1 | 3/2006 | Lindblom et al. | |
| 2006/0287109 A1 | 12/2006 | Mercado et al. | |
| 2009/0077664 A1 * | 3/2009 | Hsu et al. | 726/24 |

* cited by examiner

Primary Examiner — Jeffrey D Popham

(74) Attorney, Agent, or Firm — Robert Ryan Morishita; Morishita Law Firm, LLC

(57) ABSTRACT

A system and device includes a data storage that stores a use record and data readable by a platform processor at a platform. An executable controller executed from the data storage directs the relationship between the data storage and the platform processor. The platform processor reads the data and, optionally, generates and writes a use record to the data storage.

20 Claims, 7 Drawing Sheets

SYSTEM, METHOD, AND DEVICE FOR STORING AND DELIVERING DATA

RELATED APPLICATION DATA

The present application is a continuation-in-part of U.S. patent application Ser. No. 11/788,602, entitled "System, Method, and Device for Conducting a Game of Chance," filed Apr. 19, 2007 by Applicants herein which, in turn, is a continuation-in-part of U.S. patent application Ser. No. 11/519,161, entitled "System, Method, and Device for Conducting a Game of Chance," filed Sep. 11, 2006 by Applicants herein which, in turn, is a continuation-in-part of U.S. patent application Ser. No. 11/503,321, entitled "System and Device for Conducting a Game of Chance," filed Aug. 10, 2006 by Applicants herein.

FIELD OF THE INVENTION

The present invention relates to data storage and delivery. More specifically, the present invention relates to a method, system, and device for storing and delivering data at a platform such as a computer, game console, cellular telephone, PDA, or the like.

BACKGROUND OF THE INVENTION

Data may be stored in many different forms and delivered to many different types of platforms. For example, movies, music, and games may be stored on a CD (or compact disc) or DVD (or digital versatile disc), which can be read by a personal computer, game console, or disc player for delivery to the user. The primary drawbacks of a physical format such as a CD or DVD are the portability of the disc, the portability of the player, the potential loss of the data if the disc is physically damaged, and the inability to control copying and piracy of the data. More recently, electronic formats have enabled movies, music, books, photographs, and games to be downloaded or streamed via the Internet or local area network ("LAN") to a device connected to a server that stores the data, such as media content. These electronic formats are usually more portable than physical media and the players used to view such electronic formats, such as PDAs (or personal digital assistants) and cellular telephones, are typically more portable than a disc player. However, electronic formats are generally very easy to copy, e.g. pirate.

Digital rights management ("DRM") schemes have been developed to control piracy. A common DRM measure is to only permit data to play on a registered device. For example, some data providers require the user to install proprietary software on the user's computer to download data then only allow the user to transfer the downloaded content to attached devices that are "registered" by the software. Since this data is only playable on registered devices (even if the user has a legitimate, paid-for copy of the data), the data will not play on, for example, a new device or a new computer until the user can change the settings on the user's account. Ultimately, however, this form of DRM is not closely tailored to the problem of copying and piracy because the user with a legitimate, paid-for copy of the data may be unduly burdened by the requirement to register each device to play the data while the user who wishes to pirate a copy of the data can easily find utilities online to "crack" the DRM and pirate the data, such as media content.

SUMMARY OF THE INVENTION

The present invention includes a system for storing and delivering data. According to an optional embodiment, the present system includes a platform, which could be software, hardware, or firmware. In an optional embodiment in which the platform is hardware, such as a general purpose computer, specific use computer, cell phone, handheld device, or the like, the platform has a platform processor. Optionally, the platform processor is physically associated with memory, such as random access memory ("RAM").

In one optional embodiment, the present invention includes a platform, which may take any physical form, that includes a platform processor physically associated, and in communication, with memory and a data storage physically separate from the memory and readable by the platform processor. The data storage stores, in non-volatile storage, an executable wrap securing data, an executable controller, and an executable sensor. The wrap is an executable program, or group of executable programs, that includes program instructions to copy the executable sensor and a sister of the executable controller to the memory. The data is secured in the wrap by the sister of the executable controller in the memory cooperating with the executable controller in the data storage to automatically and continuously permit or deny access by the platform processor to data protected by the wrap. In this manner, the data protected by the wrap are only accessible to the platform processor when both the sister of the executable controller in the memory and the executable controller in the data storage are accessible to the platform processor. Put another way, if either the executable controller in the data storage or the sister of the executable controller in the memory are missing, the data protected by the wrap cannot be accessed. More specifically, the data protected by the wrap must be accessed by the executable controller and passed to the sister of the executable controller so that the platform processor can access the data when it reaches the memory.

The executable sensor monitors at least one of the platform and the data storage for anomalies and, upon detecting an anomaly, deny access to the data secured by the wrap. In an optional embodiment, the executable sensor denies access to the data secured by the wrap by deleting the sister of the executable controller from the memory upon detecting an anomaly. In an optional embodiment, the platform includes at least one data port and a power supply that supplies power to the platform including the data storage. Moreover, the platform operates in an operating environment controlled by an operating system that allocates system resources of the platform. In one such optional embodiment, the anomalies monitored by the executable sensor may include: a data port open on the platform, the amount of power delivered to the data storage by the platform, access to system resources used by the executable controller, access to system resources used by the sister of the executable controller, and access to system resources used by the wrap.

Optionally, the wrapped data may only be accessible on a platform uniquely identified with the wrap. For example, in one optional embodiment, the sister of the executable controller stores a unique identifier of the platform in the executable controller such that the data protected by the wrap is accessible only to a platform processor associated with a platform with a unique identifier matching the unique identifier stored in the executable controller.

The present invention also includes embodiments of a method for storing and delivering data to a platform having a platform processor physically associated, and in communication, with memory. A data storage readable by the platform processor is provided. An executable wrap that protects data is stored in the data storage.

An executable controller and an executable sensor are stored in the data storage. The executable sensor and a sister of the executable controller are installed at the memory. The sister of the executable controller is executed from the memory by the platform processor. The sister of the executable controller cooperates with the executable controller at the data storage to automatically and continuously permits or denies access by the platform processor to the data protected by the wrap. In this manner, the data protected by the wrap is only accessible to the platform processor when both the sister of the executable controller in the memory and the executable controller in the data storage are accessible to the platform processor.

The executable sensor monitors at least one of the platform and the data storage for anomalies and, upon detecting an anomaly, denies access by the executable sensor to the data secured by the wrap. In one such optional embodiment, the executable sensor denies access by the platform processor to the data secured by the wrap by deleting the sister of the executable controller from the memory upon the executable sensor detecting an anomaly. In an optional embodiment, the platform includes at least one data port and a power supply that supplies power to the platform including the data storage. Additionally, the platform may operate in an operating environment controlled by an operating system that allocates system resources of the platform. In one such optional embodiment, the executable sensor monitors for at least one of: a data port open on the platform, the amount of power being delivered to the data storage by the platform, access to system resources used by the executable controller, access to system resources used by the sister of the executable controller, and access to system resources used by the wrap.

Optionally, the sister of the executable controller stores a unique identifier of the platform in the executable controller. The wrap only permits access to data protected in the wrap by a platform processor associated with a platform with a unique identifier matching the unique identifier stored in the executable controller.

In a further optional embodiment, a server communicates with the platform. In an optional embodiment, the server has a server processor in communication with server memory. A server data storage readable by the server processor stores a second executable wrap and a second executable controller. In an optional embodiment, the second executable wrap protects data.

In one optional embodiment, a sister of the second executable controller is installed at the server memory. The sister of the second executable controller is executed from the server memory by the server processor. The sister of the second executable controller at the server memory cooperates with the sister of the executable controller at the memory to automatically and continuously permit or deny access by the platform processor to the data protected by the second wrap at the server data storage. In this manner, the data protected by the second wrap is only accessible to the platform processor when the sister of the executable controller in the memory communicates with the sister of the second executable controller in the server memory.

In another optional embodiment, a sister of the second executable controller at the memory at the platform. The sister of the second executable controller is executed from the memory by the platform processor. The sister of the second executable controller at the memory cooperates with the sister of the executable controller at the memory to automatically and continuously permit or deny access by the platform processor to the data protected by the second wrap at the server data storage. In this manner, the data protected by the second wrap is only accessible to the platform processor when the sister of the executable controller in the memory communicates with the sister of the second executable controller in the memory.

The present invention also includes a system including a platform in communication with a server. A platform includes a platform processor physically associated, and in communication, with a memory and a data storage physically separate from the memory and readable by the platform processor. The data storage stores, in non-volatile storage, an executable wrap securing data, an executable controller, and an executable sensor. The wrap includes instructions to copy the executable sensor and a sister to the executable controller to the memory. Data are secured in the wrap by the sister of the executable controller in the memory cooperating with the executable controller in the data storage to automatically and continuously permit or deny access by the platform processor to data protected by the wrap. In this manner, data protected by the wrap are only accessible to the platform processor when both the sister of the executable controller in the memory and the executable controller in the data storage are accessible. The executable sensor monitors at least one of the platform and the data storage for anomalies and, upon detecting an anomaly, denies access to the data secured by the wrap.

A server includes a server processor physically associated, and in communication, with server memory and a server data storage physically separate from the server memory and readable by the server processor. The server data storage stores, in non-volatile storage, a second executable wrap securing data, a second executable controller, and a second executable sensor. The second wrap includes instructions to copy the second executable sensor and a sister to the second executable controller to the server memory. The data are secured in the second wrap by the sister of the second executable controller in the server memory cooperating with the second executable controller in the server data storage to automatically and continuously permit or deny access by the server processor to data protected by the second wrap. In this manner, the data protected by the second wrap are only accessible to the server processor when both the sister of the second executable controller in the server memory and the second executable controller in the server data storage are accessible. The second executable sensor monitors at least one of the server and the server data storage for anomalies and, upon detecting an anomaly, denies access to the data secured by the second wrap, wherein the data protected by the second wrap at the server data storage is only accessible to the platform processor by transferring data via the sister of the second executable controller in the server memory at the server transferring the data to the sister of the executable controller in the memory at the platform.

In one optional embodiment, the executable sensor denies access to the data secured by the wrap by deleting the sister of the executable controller from the memory upon detecting an anomaly. Similarly, in an optional embodiment, the second executable sensor denies access to the data secured by the second wrap by deleting the sister of the second executable controller from the server memory upon detecting an anomaly.

In an optional embodiment, a platform includes at least one data port and a power supply that supplies power to the platform including the data storage. Moreover, the platform operates in an operating environment controlled by an operating system that allocates system resources of the platform. In one such optional embodiment, the anomalies monitored by the executable sensor include at least one of: a data port open on the platform, the amount of power being delivered to the data storage by the platform, access to system resources used by the executable controller, access to system resources used by the sister of the executable controller, and access to system resources used by the wrap.

In an optional embodiment, the server includes at least one data port and a power supply that supplies power to the server including the server data storage. Moreover, in an optional embodiment, the server operates in an operating environment controlled by an operating system that allocates system resources of the server. In one such optional embodiment, the anomalies monitored by the second executable sensor include at least one of: a data port open on the server, the amount of power being delivered to the server data storage by the server, access to system resources used by the second executable controller, access to system resources used by the sister of the second executable controller, and access to system resources used by the second wrap.

Optionally, the sister of the executable controller stores a unique identifier of the platform in the executable controller. In one such optional embodiment, the data protected by the wrap are accessible only to a platform processor associated with a platform with a unique identifier matching the unique identifier stored in the executable controller.

DESCRIPTION

Figure 1:
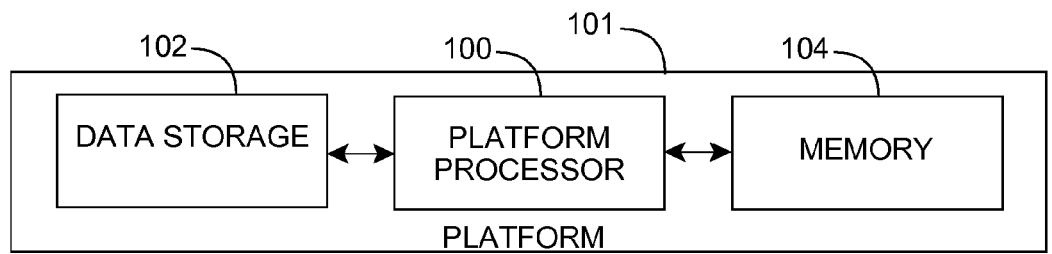
FIG. 1 is a block diagram of a system according to an embodiment of the present invention.

Reference is now made to the figures wherein like parts are referred to by like numerals throughout. Referring to FIGS. 1-4, a system, method, and device for storing and delivering data includes a platform 101. The platform 101 may be hardware, software, or firmware. For example, in one optional embodiment, the platform 101 is hardware having a platform processor 100 and memory 104. The platform 101 having a platform processor 100 could take many different forms including a general purpose computer, such as a personal computer or PC, a handheld device, such as a personal data assistant or PDA, a cellular telephone, a kiosk, a specific purpose gaming device, or any other type of device having a data processor. The functioning of the platform 101, platform processor 100, and memory 104 is described in greater detail below.

The present invention also includes a data storage 102 connected to the platform 101. The data storage 102 may be fixed to the platform 101, such as a hard drive; remote from the platform 101, such as a network file server, network storage, "cloud storage," or the like that connects to the platform via a computer network; or adapted to be removably connected to the platform 101, such as a flash drive, data card, removable hard drive, or the like that directly connects to the platform 101 rather than connecting to the platform via a network.

For example, in one optional embodiment, the data storage 102 is a hard drive that communicates with the platform processor 100 via a hard drive controller. In another example, the data storage 102 is cloud storage remote from the platform 101 that communicates with the platform processor 100 via a computer network. In another example, the data storage 102 is flash memory that is physically separate and removable from the platform processor 100 in that the data storage 102 communicates with the platform processor 100 through a serial port, such as a universal serial bus ("USB") port, a card slot, or other interface. In alternate optional embodiments, the data storage 102 may be a network-attached device or other remote device, or multiple networked or remote devices working in concert.

It is noted that in an optional embodiment, the data storage 102 may include other features and functions beyond data storage 102 functions. For example, in an optional embodiment, the data storage 102 may be integral with a cellular telephone, handheld device, PDA or the like that includes display and input functions. In such an optional embodiment, the data storage 102 may communicate directly or indirectly with an interface to display the data or data relating to the data and receive input for delivery of the data, such as media content.

In an optional embodiment, the data storage 102 stores data. The data is secured within an executable wrap. Generally, the executable wrap is a set (or collection of sets) of executable program instructions. In an optional embodiment, the wrap includes program instructions to carry out one or more of: providing an interface or menu to utilize the wrap functions; encrypting and decrypting data secured by the wrap; copying executable sensors to a memory 104 associated with a platform processor 100; and copying (or instructing an executable controller to copy) a sister to an executable controller into a memory 104.

In a further optional embodiment, a wrap may additionally generate an identifier (optionally a unique identifier) to identify the data storage 102 containing the wrap and/or assign (or read) an unique identifier for the platform 101 or platform processor 100 accessing the wrap. For example, the identifier for the data storage 102 may be generated using a software or firmware random number generator wrapped by the wrap or incorporated into the executable wrap or executable controller. Similarly, in an optional embodiment, the identifier for the platform 101 or platform processor 100 may include a serial number, IP address, network address, internet mobile equipment identity ("IMEI") number, media access control ("MAC") address, or other means for identifying the platform 101 or platform processor 100. In an optional embodiment, the identifier for the platform 101 or platform processor 100 may be stored in the wrap and may be used by the wrap to prevent the wrap from executing on platforms having a platform identifier that does not match the stored platform identifier.

As a general overview, the wrap secures data while an executable controller on the data storage 102 cooperates with a sister of the executable controller installed in the memory 104 to "unlock" the wrap so that it can be accessed at the platform 101, e.g., retrieve data from the wrap to be used, edited, viewed, or the like, at the platform, as well as save or store data at the platform in the wrap. In an optional embodiment in which the platform 101 communicates with a server 301, the server 301 may also include a sister to an executable controller in server memory 304 which cooperates with the executable controller executed from the data storage 102 to enable the server 301 to access the wrap. Sensors, running in the memory 104, monitor the platform 101 and/or server 301 (if provided) for any anomalies (described in greater detail below) and, upon detecting an anomaly, block access by a platform 101 and/or a server 301 (if provided) to the wrapped data. In one optional embodiment, access to the data is blocked by the sensors removing the sister of the executable controller from the memory 104. Since both the executable controller in the data storage 102 and the sister of the executable controller in the memory 104 are necessary to access the wrapped data in this optional embodiment, the sensors can block access to the data by blocking, deleting, or otherwise removing access to the sister of the executable controller in the memory 104.

In one such optional embodiment, the platform 101 includes a platform processor 100 and an associated memory 104. The memory 104 may store an executable controller executable by the platform processor 100 to control the flow of data to and from the data storage 102. In a further optional embodiment, the memory 104 may store an application, such as a video player, music player, photograph viewer, book viewer, game player, or the like that is executed by the platform processor 100 to play or display the data read from the data storage 102. The memory 104 may also be used temporarily in retrieving the data from the data storage 102 as well as confirming to the data storage 102 that the data storage 102 is connected to the platform.

In an optional embodiment, a server 301 having a server processor 300 and a server data storage 302 communicates with the platform 101. The server data storage 302 may include a record associated with the identifier stored on the data storage 102. When the wrap on the data storage 102 is mounted at the platform 101, the platform 101 may verify the data storage 102 by comparing the unique identifier stored at the data storage 102 with the record stored at the server 301 and, only if the data storage 102 is verified, transfers data to the platform 101. Optionally, as the data is delivered, a use record (described in greater detail below) may be stored at the server 301 and/or the data storage 102. In an optional embodiment, an electronic receipt may also be stored at the server 301 and/or the data storage 102. A purpose of the electronic receipt would be to provide a record of a transaction using the data storage 102 and/or the data stored thereon. For example, in an embodiment in which the data include media content, such as a movie, music, game, or the like, an electronic receipt may be stored in the use record to evidence the transaction in which the media content was purchased or rented and the use record may include an electronic record that the user had used the media content, e.g., viewed the movie, listened to the music, played the game, or the like. In such an optional embodiment, the electronic receipt and use record may, in combination, provide a history of the transaction. In an optional embodiment including a server 301, an electronic receipt may be stored at the server 301, optionally in server data storage 302, and in the wrap on the data storage 102 at the platform 101. These electronic receipts may enable resolution of disputes since, in this optional embodiment, the electronic receipt in the wrap on the data storage 102 may be secured by the wrap from tampering. In a further optional embodiment, the electronic receipt at the server 301 may likewise be secured from tampering with encryption, a wrap at the server 301, or the like.

In one optional embodiment, the data storage 102 stores an executable controller governing how the platform determines accessibility of the data by the platform. In such an optional embodiment, the data may be stored at a platform 101 and/or a server 301. The data in such an optional embodiment may be pre-stored at the platform 101 and/or the server 301, or may be loaded onto the platform 101 and/or server 301 through the programming instructions at the data storage 102, or may be loaded onto the platform 101 from the server 301 (or vice versa).

Additionally or alternatively, the data in the wrap at the data storage 102 may be readable by a platform processor 100. The data storage 102 containing the wrapped data may be readable or readable-writable. That is, the data stored in the wrap on the data storage 102 may be fixed, or may be changeable. For example, in one optional embodiment, data may be updated, exchanged, or supplemented by storing revised, different, or additional data. For example, in one optional embodiment, discussed in greater detail below, the data storage 102 may communicate directly or indirectly with a server 301 that delivers data to the data storage 102 such as through a file transfer or other communication protocol. Alternatively, the data storage 102 storing the data is readable only. In such an optional embodiment, the data may be fixed.

In one optional embodiment, the wrapped data may be encrypted in bulk and stored in the wrap by a loading program. In use, however, the wrap may act to decrypt the data when the executable controller and sister of the executable controller cooperate to access the data secured by the wrap. In a further optional embodiment, the wrap may encrypt the data going back into the wrap. For example, when saving or updating wrapped data, the updated data file may be passed by the sister of the executable controller to the executable controller and into the wrap where the wrap can encrypt the data file and, optionally, overwrite the outdated file. In an optional embodiment, the data secured by the wrap may be hidden from browsing at the platform 101. In one optional embodiment, so that the data secured by the wrap may only be viewed through the menu page of the wrap and accessed, i.e., read and written, via an executable controller in cooperation with a sister of the executable controller. In one such optional embodiment, the data in the hidden sub-components may not be browsed through the operating system of the platform, applications, application program interfaces, or the like, but rather can only be accessed by the wrap, executable controller, and sister of the executable controller which can display and access the contents of the wrap.

In another optional embodiment, an additional feature of using physically hidden areas in the data storage may be combined with the encryption. For example, in the example illustrated in FIG. 4, a data storage 102 may include a firmware area 406 and a flash memory area 422. The firmware area 406 may include a firmware controller 408, device mounting firmware 410 (e.g., firmware or, alternatively, software, that communicates with an operating system to mount the device), a file-based command channel 412, and the like. In an optional embodiment, a security module 414 may function alone, or in part, to access data within the wrap and move data from inside the wrap to outside the wrap. The flash memory area 422 of the data storage 102 may be partitioned into sub-components, some of which may or may not be hidden from browsing at the platform, which contain the data as well as a use record, an executable controller, or the like. In one optional embodiment, the hidden sub-components may not be accessible, except through an executable controller described in greater detail elsewhere. Specifically, hidden sub-components may be configured such that the data in the hidden sub-components may not be browsed through the operating system of the platform, or the like, but rather can only be accessed by the executable controller which can locate and access the hidden sub-components. For example, in the optional embodiment of FIG. 4, a data hidden area 420 may contain data, such as media, executable programs, and the like, while a use record hidden area 418 may store a record of use history, credit history, or the like (as discussed below). Conversely, a read-only autorun 416 may be stored in a non-hidden area, thereby making the autorun file available without proceeding through an executable wrap. In an optional embodiment, the autorun may initiate a menu within the wrap to enable the wrap to install sensors, monitor the platform 101, install a sister to the executable controller, and thereby provide access to data secured in the wrap.

It is noted that the data may not necessarily all be contained in a single hidden sub-component or hidden area. That is, the data may be split among multiple sub-components. In one such optional embodiment, a file may be split, with separate segments stored in multiple different hidden sub-components. An executable controller may locate and access the hidden sub-components to deliver the data in a coherent order. Thus, when the file is played back by the platform processor, the data appears in order, even though it was accessed from multiple hidden sub-components in segments. In like manner, an executable game may exist in multiple parts in various hidden sub-components. In using the executable controller to access the executable game files, the platform processor may execute the executable game properly only when those executable game files are retrieved by the executable controller from the various hidden sub-components. This creates a substantial obstacle to hacking and copying since the data (e.g., data data files, executable programs, executable games, and the like), is segmented into hidden sub-components which can only be accessed by the executable controller and, in fact, can only be located by the executable controller since the operating system, application program interfaces ("APIs"), applications, and the like are prevented from locating the hidden sub-components. Moreover, since the data is segmented, even if some of the hidden sub-components could be located and hacked, only a portion of the data stored therein could be compromised.

In either case, in one optional embodiment, the data storage 102 stores data in a single area or partition of the data storage 102 alone or with other additional data. In another optional embodiment, the data storage 102 is partitioned into multiple sub-components so that other data may be stored separately on the data storage 102 with the data in one sub-component and other data in a separate sub-component(s). For example, in certain optional embodiments, the data storage 102 is partitioned into one or more sub-components, with data stored in one of the sub-components. In an optional embodiment in which sub-components or areas are hidden, the data may be stored in a separate hidden area 420.

In an optional embodiment, the executable controller may "open," retrieve, then "close" the wrap only when needed so that the wrap is only "open" when data is read from, or written to, the wrap. Where the wrap contains sub-components, the sub-components of the wrap (whether physically hidden or not) are only opened as needed. In other words, in one optional embodiment, the executable controller only accesses the sub-component containing the data called for, and does not leave "open" any sub-components not currently being accessed. For example, if a media file is divided among twelve sub-components, the executable controller may accessed the sub-component containing the first segment of the media file and, after that first segment of the media file is cached, close the sub-component before accessing the sub-component containing the second segment of the media file. In this manner, a data sniffing program or other surreptitious data monitor may not be presented with an opportunity to access any data, other than the data being immediately accessed.

Figure 2:
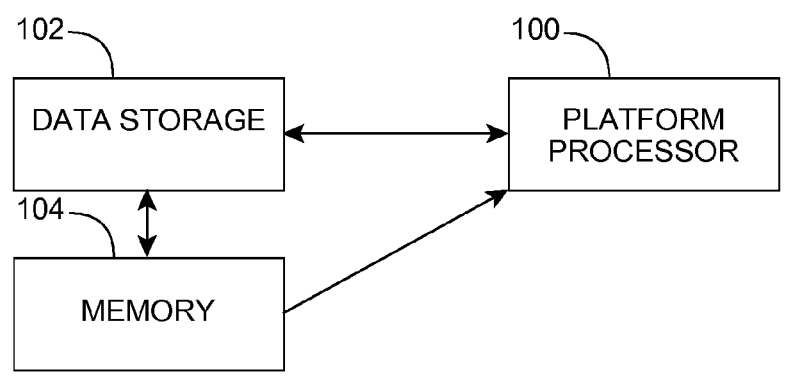
FIG. 2 is a block diagram of a system according to an embodiment of the present invention.
Figure 3:
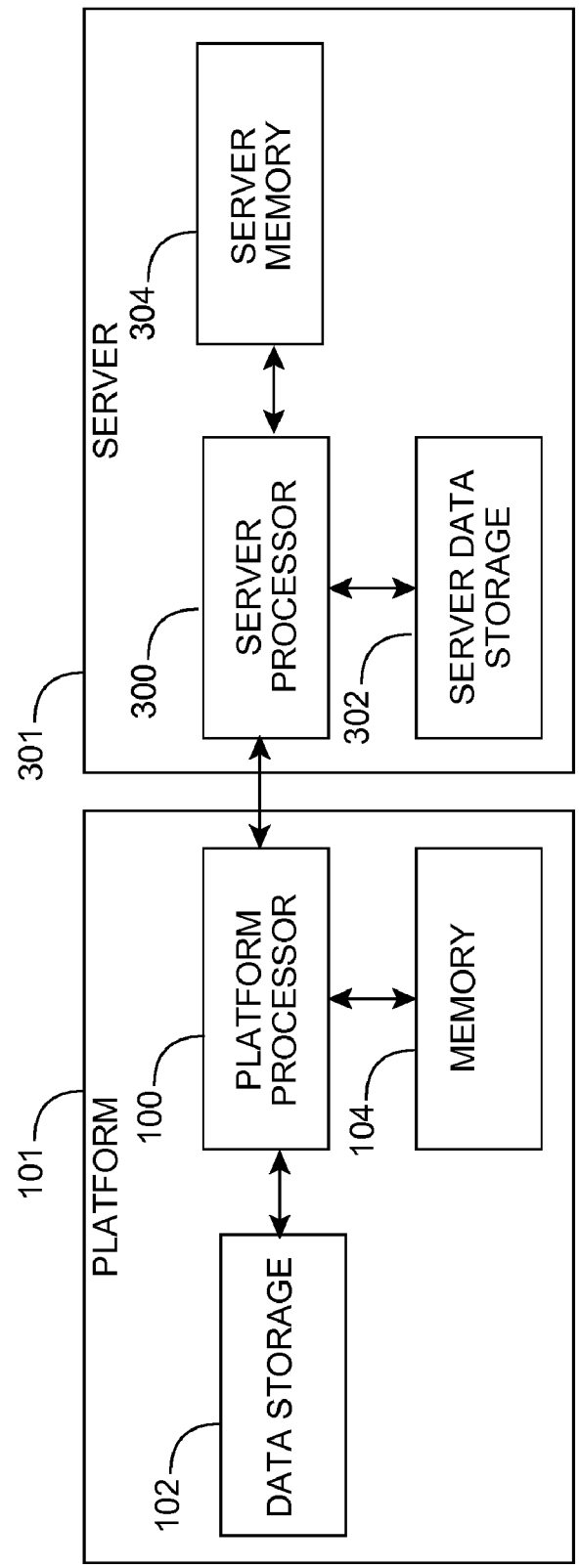
FIG. 3 is a block diagram of a system according to an embodiment of the present invention.

Referring generally to the optional embodiment of FIGS. 1-8, an executable controller executable by a platform processor 100 governs the use of the data and the relationship between the data storage 102 and a platform processor 100. In one optional embodiment, an executable controller or a sister of an executable controller is stored in memory 104. Optionally, the memory 104 is at the platform 101 as shown in FIGS. 1 and 3, although it is contemplated that the memory 104 could be part of the data storage 102 or associated with the platform 101, but not physically incorporated into the platform 101, as shown in FIG. 2. For example, in an optional embodiment, an executable controller is stored in a memory 104 physically associated with the platform processor 100, such as in random access memory ("RAM") associated with the platform processor 100. In yet another optional embodiment, the executable controller is stored in a more persistent data structure such as a hard drive, optical memory, magnetic memory, or the like at the platform 101. In optional embodiments in which the executable controller is stored in memory 104, an executable controller may be installed from the data storage 102. That is, in one optional embodiment, the data storage 102 stores an installer that installs an executable controller for controlling play of the data at the memory 104.

Figure 4:
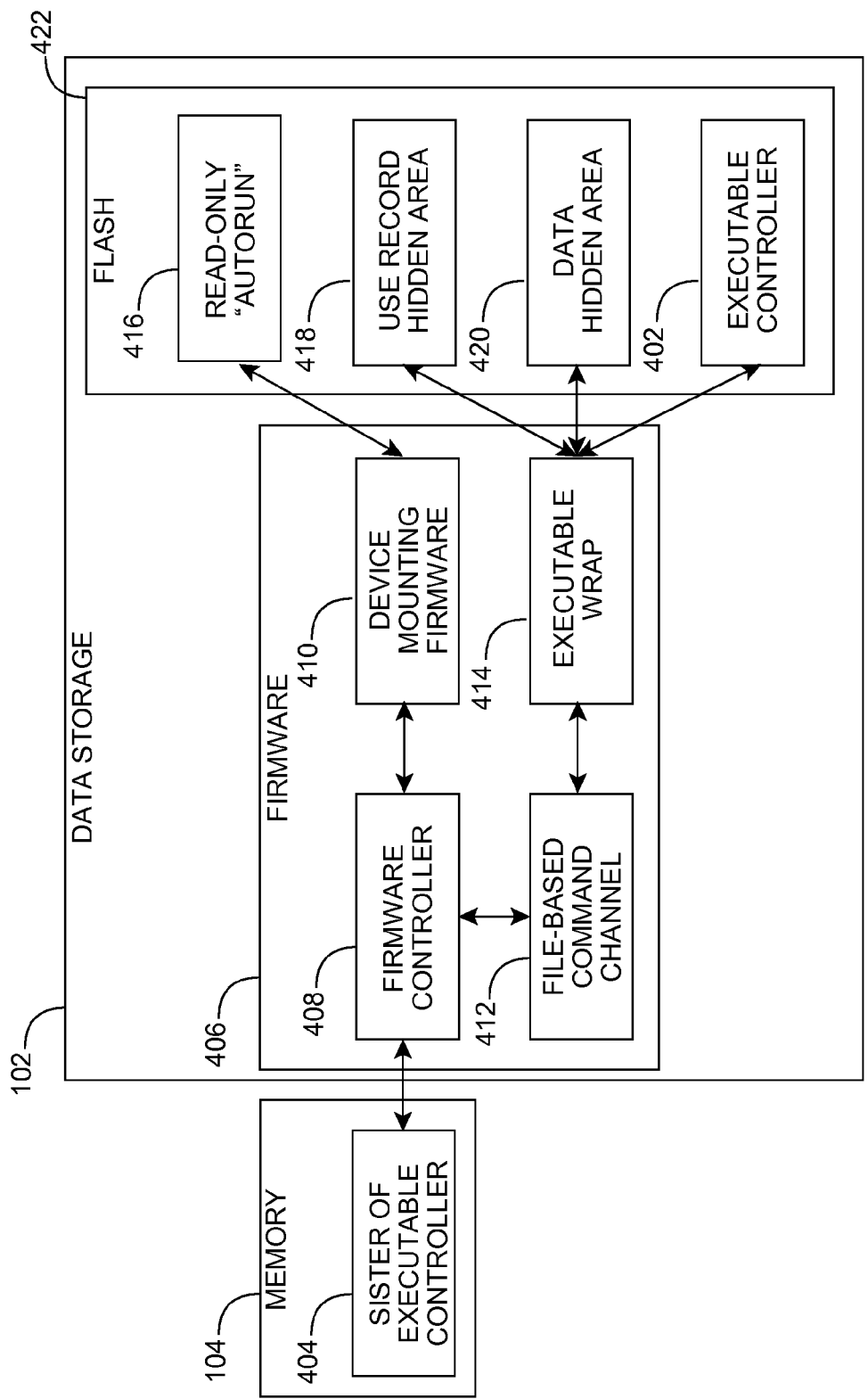
FIG. 4 is a block diagram of a device according to an embodiment of the present invention.
Figure 5:
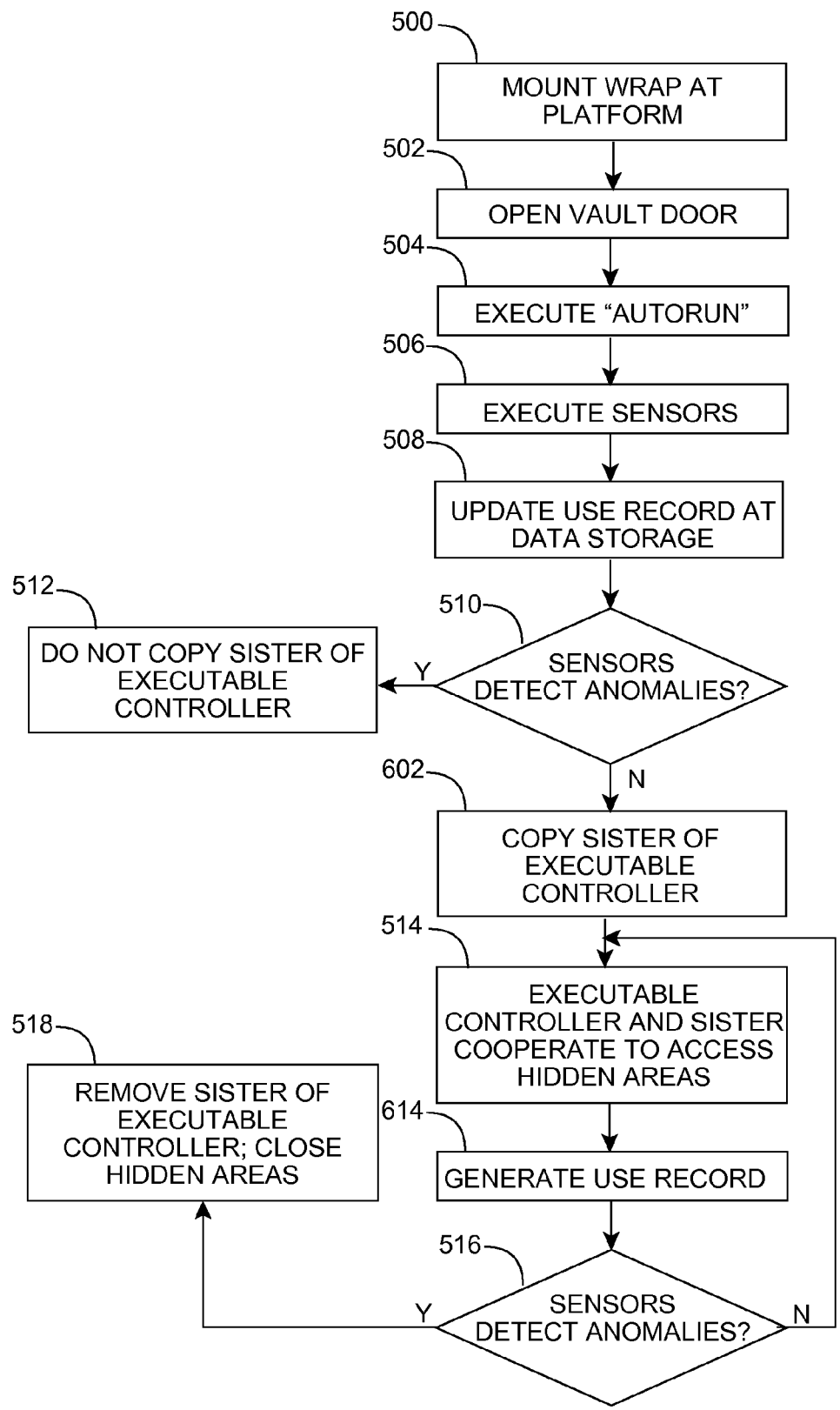
FIG. 5 is a flow chart of a method according to an embodiment of the present invention.

More specifically, in one optional embodiment illustrated in FIGS. 4 and 5, a sister of an executable controller 404 may be copied 602, e.g., installed, to memory 104 physically associated with a platform 101 from a data storage 102 when the wrap is mounted at a platform 101. In one such optional embodiment, the executable controller 402 stored on, and executed from, the data storage 102 works in cooperation with a sister to the executable controller 404 copied to, and executed from, memory 104. The copying of the sister to the executable controller may be controlled in any manner. For example, in an optional embodiment in which the data storage 102 is a fixed hard drive or removable data card, flash drive, or the like, the data storage 102 may store an executable "autorun" file 416 and data protected by a wrap. The platform 101 executes 504 the executable "autorun" which permits communication with the wrap. In an optional embodiment, the wrap may only be accessible through the executable "autorun." In one optional embodiment, the "autorun" extracts a menu from the wrap. As previously noted, in an optional embodiment, the menu may be extractable from the wrap only through the executable "autorun" and, thus, the options available through the menu may only be accessible after the "autorun" has executed. Specifically, in an optional embodiment, the wrap protecting the wrapped data may prevent access to the data inside the wrap by the operating system, applications, APIs, or the like, so that neither the menu nor the data may be accessed without the "autorun" first executing. The wrap may take many different forms, including an interface, encryption protocol, or the like. In an optional embodiment, the wrap is an executable program, e.g., an executable wrap, that only communicates with the executable "autorun" 416. As noted above, in an optional embodiment, a security module 414 may cooperate with the wrap to move data inside and outside of the wrap.

Within the wrap, i.e., among the wrapped data, is an executable controller 402. In an optional embodiment, the wrap instructs the executable controller to create 602 a "sister" of itself in the memory 104, e.g., RAM, of the platform 101. In another optional embodiment, the wrap instructs the executable controller to create a sister of itself in server memory 304 of a server 301. In yet another optional embodiment, the wrap instructs or authorizes a server 301 to create a sister of the executable controller in the memory 104 of the platform 101.

In one optional embodiment, the sister of the executable controller stored in, and executed from, the memory 104 of a platform 101 (or the server memory 304 of a server 301) is identical to the executable controller stored on, and executed from, the data storage 102. In another optional embodiment, the sister of the executable controller stored in, and executed from, the memory 104 of a platform 101 (or server memory 304 of a server 301) is not identical to the executable controller which is installed on the data storage 102, but the sister programs, that is, the executable controller stored on, and executed from, the data storage 102. In either optional embodiment, the sister of the executable controller 404 stored in, and executed from, the memory 104 of a platform 101 (or the server memory 304 of a server 301), cooperates 514 with the executable controller 402 stored on, and executed from, the data storage 102 and only transfer data to and from each other. Put another way, the executable controller running from the data storage 102 and the sister of the executable controller running from the memory 104 of a platform 101 (or server memory 304 of a server 301) only pass data to each other and these data are not accessible, and do not pass through, any other operating system, application, APIs, or the like. In this sense, the data of such an optional embodiment are secure from viewing or tampering through the operating system, applications, APIs, or the like. Thus, in an example directed to executable programs, such as an executable game program, the game program stored on the data storage 102 may be executed by the platform processor 100 only by passing data and commands through the executable controller and sister of the executable controller so that the data and commands are secure from sniffing or hacking, and the game program is not accessible for hacking or copying, through external programs, i.e., any program other than the executable controller or sister of the executable controller. In an optional embodiment, the executable controller and sister of the executable controller communicate directly and are continuously available to communicate, although it is contemplated that the sister of the executable controller and executable controller may not necessarily continuously communicate.

In an optional embodiment, this security may be enhanced using executable sensors. In an optional embodiment, the wrap contains executable software or firmware sensors which are copied to, and executed 506 from, the memory 104 of the platform 101 before the sister of the executable controller is created in the memory 104. The sensors may be configured to monitor 510 the platform 101 and/or data storage 102 for anomalies that may suggest that the operating environment is not secure. In an optional embodiment, the sensors may sense one or more of: (a) whether a debugger, data sniffer, or other spyware is operating (e.g., by detecting whether a port is open on the platform 101); (b) whether the data storage 102 is connected to the platform 101 (e.g., by detecting whether power is being delivered to the data storage 102 by the platform 101); and/or (c) whether any system resources, such as file directories, used by the executable controller, sister of the executable controller, "autorun," or wrap have been, or are being, accessed (which may suggest that hacking is being attempted). At the outset, any problems detected by the sensors may be communicated to the wrap, which does not copy 512 the executable controller to, or create the sister of the executable controller in, as the case may be, the memory 104 of the platform 101. Put another way, the sensors first determine whether the environment on the platform 101 is safe for the executable controller, or sister of the executable controller, as the case may be.

In an optional embodiment, another layer of security may be interposed between the "autorun" and the data processor at the platform 101. In one optional embodiment, such a "vault door" may prevent the platform 101 from executing the "autorun" until unprompted input is received, thereby opening 502 the vault door. By "unprompted," it is contemplated that the platform displays a desktop view or window view typical for any storage device and otherwise provides no prompting to the user for input. Thus, the user would need to know that input is needed since no prompt would appear, as well as the input called for. The vault door optionally monitors the input device, such as a keyboard, at the platform 101 for input and allows the "autorun" to execute after the input is received. In an optional embodiment, the input is a password, passcode, PIN, or other alphanumeric string. Alternatively, the input may be biometric data and the input device may be a fingerprint scanner, retina scanner, voice reader, or other biometric input device.

As noted above, in an optional embodiment, the executable controller stored on the data storage 102 may create or copy a sister of the executable controller stored in memory 104 physically associated with the platform 101. The operation of the executable controller and sister of the executable controller is described in greater detail below. In an optional embodiment, the sister of the executable controller is only temporarily stored in memory 104. In one such optional embodiment, the sensors discussed above may be used to determine whether the operating environment is secure. If the sensors determine 516 that the operating environment is not secure, the sister of the executable controller may be deleted 518 from memory 104. The deletion of the sister of the executable controller results in a stoppage of all wrapped data because both the sister of the executable controller and the executable controller are needed to access the wrapped data; without the sister of the executable controller, the wrapped data is inaccessible to the platform 101. In this sense, the sister of the executable controller may be termed a "ghost" program in that the sister of the executable controller only operates in cooperation with the executable controller and disappears, i.e., is deleted from the memory 104, if that cooperation is compromised.

The sister of the executable controller may also be termed a "ghost" program in that it may not be directly visible to the user. That is, in an optional embodiment, the sensors may monitor the resources used by the sister of the executable controller and the executable controller. In the event that a user attempts to view the sister of the executable controller or, in an optional embodiment, the files and/or directories used by the sister of the executable controller, it may disappear, i.e., be deleted from memory 104. In an optional embodiment, the data storage 102 may include a power source, such as a battery backup, to enable an executable controller stored on, and executed from, the data storage 102, to write the final data or commands received from the sister of the executable controller in the event that the sister of the executable controller disappears due to loss of power or loss of connection. In such an optional embodiment, disconnecting or removing the data storage 102 or shutting off the power to the platform 101 and/or the data storage 102 would not be effective to cancel the most recent transaction, data transfer, command, or the like communicated between the sister of the executable controller and the executable controller. As discussed above, the final (or most recent action) prior to disconnection, loss of power, loss of signal, or the like, may be written to an electronic receipt and/or a use history that is secured by the wrap.

To summarize briefly, in one optional embodiment, data are stored on a data storage 102 and secured by a wrap. The data may include an executable controller that is stored on, and executed from, a data storage 102 in cooperation with a sister of the executable controller stored in, and executed from memory 104. Where the wrapped data stored at the data storage 102 includes an executable program, such as a game program, the game program can thus be executed from the data storage 102 without storing the game program in the memory 104 associated with the platform processor 100 through data and commands sent by the executable controller to the sister of the executable controller.

More broadly, any data stored in the wrap may be secured by the wrap and accessible only by the sister of the executable controller in cooperation with the executable controller, thereby securing the data from, for example, viruses or trojans which would be blocked from reading the wrapped data or writing malicious code into the wrapped data. Similarly, the wrapped data would be secured from, for example, hacking by attempting to read the data storage 102 remotely because the remote device would lack the sister of the executable controller and, therefore, be denied access to the wrapped data. Moreover, the wrapped data may be secured from tampering because the wrap and/or executable controller may include parameters defining the data files that may be overwritten or altered and, therefore, could be configured to block the platform 101 from altering certain files, even if the platform 101 is otherwise permitted to read and view the files. For example, as discussed above, in an optional embodiment an electronic receipt, use history, and the like may be secured by the wrap. In an optional embodiment, the electronic receipt, use history, or the like may be viewable at the platform 101 (for example, through the menu page initiated by the autorun), but the wrap may block the platform 101 from writing, overwriting, or altering the electronic receipt.

In an alternate optional embodiment, the executable controller is stored at, and executed from, the data storage 102 without storing an executable controller at the memory 104 physically associated with the platform processor 100. In other words, rather than installing the executable controller on the platform, the executable controller may be executed from the data storage 102. In this optional embodiment, a sister or other copy of the executable controller may not be installed on the memory 104 of the platform 101.

Referring generally to FIGS. 1-8, the executable controller, and optional sister of the executable controller, may include various components for the operation of the platform processor 100 and the data storage 102. Generally, the executable controller may include such features as security and/or data integrity procedures, record keeping procedures, or the like. In one optional embodiment in which the data includes a game, the executable controller stored may include a random number generator or some other means for generating a random number. As may be appreciated, a random number generator may take many different forms and may generate random numbers in many different ways. In an optional embodiment, the random number generator is stored in the memory 104 separate from the game of chance stored on the data storage 102 so that the game of chance can only be conducted when the data storage 102 is connected to the platform 101.

In one optional embodiment, the executable controller may also secure certain data from tampering by encrypting the data, preventing the platform processor 100 from overwriting or altering the data, or the like. For example, when the wrap is mounted at the platform 101, the areas of the wrap storing data may be "unlocked" so that it can be read from the data storage 102 by the platform processor 100 via the executable controller and, optionally, the sister of the executable controller, and other secure writable areas of the wrap may be "opened" so the platform processor 100 can write to the data storage 102 via the executable controller and, optionally, the sister of the executable controller.

In an optional embodiment, readable areas of the wrap may be locked and writable areas of the wrap may be closed under one or more of a variety of circumstances. In one optional embodiment, the wrap is locked and closed whenever data is neither being read from or written to the data storage 102. Thus, as suggested above, the wrap is not left unlocked and open when it is not in use; rather, it is closed and locked when it is not in use. As discussed above, a wrap may include sensors, e.g., program routine(s), to determine the connection status between the platform processor 100 and the data storage 102, an monitor the memory 104 (whether RAM, hard drive, or the like) physically associated with the platform processor 100, the power received by the data storage 102 from the platform, or the like, to ensure that the wrap only unlocks readable sub-components and opens writable sub-components when the sensors do not detect any anomalies. Moreover, in an optional embodiment, the sensors may trigger the removal of the sister of the executable controller from memory 104 upon detection of an anomaly such that the platform 101 is disabled from accessing the wrapped data as discussed above. In yet a further optional embodiment, the data storage 102 may be removable from the platform 101 (such as a portable memory card, drive, or the like). In one such optional embodiment, the wrap may be locked and the secure areas or sub-components of the data storage 102 may be closed when the data storage 102 is removed from the platform.

In one optional embodiment, when the wrap stored on the data storage 102 is mounted at the platform 101 (e.g., the autorun starts, installs sensors to ensure the platform 101 is safe, and runs the wrap menu) the executable controller, which is either executed from the data storage 102 or executed through a sister to the executable controller copied to memory 104 local to the platform processor 100, causes the platform processor 100 to assign the data storage 102 a unique identifier. Optionally, the unique identifier is randomly generated by the platform processor. In another optional embodiment, the data storage 102 is preassigned a unique identifier, such as when the data storage 102 is created or prior to distribution of the data storage 102 to the player, and the unique identifier is stored on the data storage 102. In an optional embodiment, the unique identifier may also be stored on the platform 101. In one such optional embodiment, the wrap on the data storage 102 may be executed only on the platform 101 storing the unique identifier for that data storage 102, thereby tying the platform 101 to the data storage 102 and preventing the wrap on the data storage 102 from being used with any other platform 101. Similarly, the wrap may identify the platform 101, in any of a variety of ways, such as by using a serial number, IMAP address, MAC address, IP address, or the like, and store the platform identifier in the wrap. In this manner, the wrap may ensure that the wrap is used only at a specific platform 101, such as the platform 101 on which it was originally opened.

In a further optional embodiment, a key, such as a password, a pass code, a PIN, the unique identifier generated, or the like, is installed by the executable controller on both the data storage 102 and the platform processor 100 executing the executable controller. In a further optional embodiment, the executable controller encrypts the key.

Optionally, a key is used in combination with the unique identifier assigned to the wrap to verify the source of the data while conducting any transactions involving wrapped data. For example, in an optional embodiment described in greater detail below, the executable controller executed from the data storage 102 by the platform processor 100 may direct the platform processor 100 to write data, such as a use record or other media play data, to the data storage 102. In one such optional embodiment, the data written into wrap on the data storage 102 may be verified using the key and/or the identifier. For example, an electronic receipt written into the wrap on the data storage 102 may be uniquely identified based on the key, the identifier of the wrap (or data storage 102), the platform identifier, a server identifier, if any, or any combination thereof. In another example, the key and/or identifier assigned to the data storage 102 is used to access or "unlock" a record stored remote from the data storage 102, such as at a server 301.

As discussed above, in an optional embodiment, the data storage 102 may additionally be writable. In an optional embodiment, a wrapped sub-component 404 of the data storage 102 is writable. In one such optional embodiment, the executable controller executed by the platform processor 100 direct the platform processor to write a use record to the data storage 102 as data is read from the data storage 102. In one such optional embodiment, the executable controller is executed from the data storage 102, without installing the executable controller into the memory 104 physically associated with the platform processor 100 or by copying a sister of the executable controller to the memory 104 physically associated with the platform processor, to cause the platform processor 100 to write a history, e.g., a use record, transaction record, electronic receipt, or the like, at the data storage 102. It is contemplated that, although the executable controller may not necessarily be installed at the memory 104, the executable controller may temporarily borrow the memory 104, such as the RAM or hard drive, associated with the platform processor 100 as the executable controller is executed. In an alternate optional embodiment, in which a sister of the executable controller is installed in the memory 104, the sister of the executable controller may transfer history data directly to the writable areas of the data storage 102 either with or without cooperation of the executable controller stored on, and executed from, the data storage 102.

For example, in one optional embodiment, a play limit may be pre-written to a use record stored at the data storage 102. In one such example, the data storage 102 may be loaded with a balance of time or play before it is distributed to the player. In another optional embodiment, the platform processor 100, optionally under the direction of the executable controller or an optional server 301, may write a play limit to a use record stored at the data storage 102. In one such example, the data storage 102 may be loaded with a balance of time or play when the data storage 102 is first connected to a platform and the player directs the loading.

Optionally, the data storage 102, or the sub-component of the data storage 102, that stores the use record, and any electronic receipts that are part of the use record, is secure. For example, in one such optional embodiment, the use record is stored in the wrap. In another example, the use record is stored in a write-once-read-many ("WORM") storage such that once written, the use record cannot be rewritten or altered. In another optional embodiment, the data storage 102 is read-write memory ("RWM"), but the executable controller, working alone or in combination with the key and/or identifier, may limit or prevent access to the use record data by the platform processor 100, server 301, or the like as well as the ability to rewrite or alter the use record. For example, in an optional embodiment including a server 301, the platform processor 100 may be restricted from writing, rewriting, or altering the use record, electronic receipts, or the like stored at the data storage 102 until instructed to do so by the server processor 300 at the server 301. In any of these optional embodiments, it may be the executable controller in cooperation with the sister of the executable controller that read the use record from the data storage 102 for use by the platform processor 100, server 301, or the like. It is noted here that in an optional embodiment in which the platform processor 100 communicates with a server 301, described in greater detail below, the use record and any electronic receipts may be stored at a server data storage 302 in addition to, or in place of, the data storage 102.

Similarly, a use record and/or electronic receipt may be generated by the platform processor 100 as the platform processor 100 reads the data from the data storage 102. In an optional embodiment, the use record and/or electronic receipt may be written to the data storage 102 by the platform processor 100 under the direction of the executable controller. As described above, the integrity of the use record and any electronic receipts may be secured. As above, the use record and any electronic receipts may be preserved by storing the use record and/or electronic receipts within the wrap. In another optional embodiment, the use record and any electronic receipts may be preserved by using WORM storage or the executable controller may limit or prevent access to the use record using security measures such as encryption, use of the key and/or the identifier, or other security measures as well as the ability to rewrite or alter the use record.

For example, in an optional embodiment including a server 301, the platform processor 100 may be restricted from writing, rewriting, or altering the use record stored at the data storage 102 until instructed to do so by the server processor 300 at the server 301. In any of these optional embodiments, it may be the executable controller that reads the use record from the data storage 102 for use by the platform processor 100, server 301, or the like. As with the use record, in an optional embodiment in which the platform processor 100 communicates with a server 301, the use record may be stored at a server data storage 302 in addition to, or in place of, the data storage 102.

In an optional embodiment in which a use record is stored, various events of may be included in the use record. The use record may include a credit history and a use history. It is contemplated that in such an optional embodiment, the credit history and use history may be stored together or separately, e.g., in separate sub-components of a data storage 102. In an optional embodiment, the use history may store events relating to the data stored on the data storage 102. For example, in one optional embodiment, the number of times the data is read from the data storage 102 (e.g. the number of times the data is played), or the time duration the data is read from the data storage 102 (e.g. the duration that the data is played), or the time window during which the data is read from the data storage 102 (e.g. the day or time of day that the data is played), or the like, may be recorded in the use record. In such an optional embodiment, the use record may track whether the data has been read from the data storage 102 and, based on the use record, the executable controller may determine whether the data is available to be read from the data storage 102 by the platform processor 100. In an optional embodiment, the use record may optionally be updated as the data is read from the data storage 102 by the platform processor 100. Data stored in a credit history section of a use record may determine the eligibility to read data from the data storage 102. For example, in an optional embodiment in which the data include media content, the credit history may store the amount of time (e.g., available for three days) or the number of "plays" (e.g., available for one viewing) associated with the data. Similarly, in an optional embodiment in which the data include a playable game program, the credit history may store the amount of money, whether "real" or "fictional" money, available for use in playing the game (e.g., $100.00 balance) or the number of plays (e.g., thirty games) associated with the data. It is contemplated that the use record, including any credit history section and use history section, may be updated, optionally in real time, as data are accessed from the data storage 102. For example, a credit history may be debited by amounts used in a game, plays, viewings, time, or the like, and the use history may record the event such as by writing the viewing time, game play event(s), game play outcome, or the like.

It is contemplated that the player or viewer for playing or displaying the data at the platform may be part of the executable controller stored at, and optionally executed from, the data storage 102 or may be a separate program stored at the memory 104 associated with the platform processor 100. That is, in one optional embodiment, the platform processor 100 may read the data from the data storage 102 for play or display by a player or viewer on the platform and distinguishable from the executable controller stored on the data storage 102.

As noted above, the device of the present invention may be part of a system according to an optional embodiment of the present invention. In such a system, a platform 101 may have a fixed or removable data storage 102. In an optional embodiment, the platform processor 100 is physically separate from the data storage 102. The system further includes a memory 104 physically associated with the platform processor 100 and a data storage 102 storing the data, such as media content. As noted above, the memory 104 may be physically associated with the platform processor 100, such as RAM or a hard drive used by the platform processor 100, or may be physically associated with the data storage 102, such as a partition or sub-component of the data storage 102, or may be remote from the platform 101, such as on a networked server 301. In one optional embodiment, the data storage 102, or a sub-component thereof, stores an installer that installs an executable controller, a copy of an executable controller, or a sister of an executable controller on a memory 104 associated with the platform processor 100, e.g. RAM, hard drive, or the like. In this manner, the data storage 102 may contain all the components needed for a platform 101 to use the data storage 102 and read the data stored thereon. In an alternate optional embodiment, the executable controller may be executed directly from the data storage 102 without the need for installation from the data storage 102 to the memory 104.

In a further optional embodiment, a server 301 may be provided. It is contemplated that the server 301 could take many different forms and perform any of a plurality of tasks such as storing files for transfer to and from the platform processor 100, storing the executable controller for operation of the platform processor 100, extracting data such as use record, or the like from the platform processor 100 or data storage 102, or other tasks. In one such optional embodiment, a server 301 may include a server processor 300 and a server data storage 302. Optionally, the server data storage 302 includes one or more records associated to a data storage 102. In an optional embodiment in which the executable controller randomly generate an identifier for the data storage 102, records associated with a data storage 102 may be identified by the identifier for that data storage 102.

Referring to FIGS. 1-8, in use, the data storage 102 is placed in communication with the platform processor 100. As noted above, the data storage 102 is optionally a removable or fixed device, such as a flash memory connecting through a USB port. In such an example, the data storage 102 is placed in communication with the platform processor 100 by connecting to the port. In other examples, the data storage 102 may be a memory card, wireless device, wireless telephone or handheld device, or the like. In such optional examples, the data storage 102 may be placed in communication with the platform processor 100 using a wired or wireless communication link.

The executable controller governing use of the data storage 102 may be pre-loaded in memory 104 associated with the platform processor 100 at the platform 101. In an optional embodiment, a sister of an executable controller may be installed 602 in the memory 104 using an installer. The sister of an executable controller may be installed in memory 104 each time the data storage 102 is connected to the platform processor 100 at the platform 101 or, in an alternate optional embodiment, may persist in memory 104. In a further optional embodiment, the sister of an executable controller may be installed in server memory 304 (such as RAM) physically associated with a server processor 300 in place of, or in addition to, a sister of an executable controller installed in memory 104 at the platform 101. For example, in an optional embodiment, the sister of an executable controller may be installed in server memory 304 at a server 301 when a data storage 102 is connected to a platform 101 in communication with the server 301, thereby rendering the platform 101 merely a display device, input device, or otherwise a "dumb" terminal, with data processing occurring at the server processor 300 using data passed between the data storage 102 and the server memory 304 by the executable controller in the data storage 102 cooperating with the sister of the executable controller in the server memory 304. The installer could be received from, and operate through, any medium. For example, in one optional embodiment, the installer is stored on a computer readable medium, such as a compact disc ("CD"), digital versatile disc ("DVD"), floppy disc, or the like, that is separate from the data storage 102. In another example, the installer may be downloaded from a networked device, such as a file server or the like. In yet another optional example, the installer may be stored on the data storage 102. As noted above, the installer may be stored on a separate sub-component from any sub-component storing games of chance and any sub-component storing any writable credit and use record data.

In these optional embodiments, the installer installs 602 the executable controller or a sister of the executable controller. In an optional embodiment in which the data storage 102 is portable, that is, can be ported to different platform processors 100, the installer may install the executable controller or sister of the executable controller each time the data storage 102 is placed in communication with a platform processor 100 for which the executable controller have been previously installed. It is also contemplated that "portable" may optionally include attributes such easily disconnected and physically removable from the platform as well as easily carried. In an optional embodiment, the data storage 102 may be assigned a unique identifier. A file containing the unique identifier may be stored on a platform 101 and the "autorun" and/or wrap may be configured so that only the data storage 102 with a unique identifier corresponding to the unique identifier stored on the platform 101 operates on that platform 101. For example, in an optional embodiment, a platform 101 may uniquely correspond to a data storage 102 so that data storage 102 devices cannot be swapped and used in a different platform 101.

In another optional embodiment, the executable controller may be stored on, and executed from, the data storage 102. Such an optional embodiment may be directed to an application where it is desired not to store any data or executable controller on a memory 104 physically associated with the platform processor 100. In yet another optional embodiment, illustrated in FIG. 7, the executable controller may be stored on a server 301 and, thus, may not need to be installed or re-installed as the data storage 102 is ported to different platform processors 100.

The data storage 102 may be pre-loaded with a use record and/or data or the like. In another optional embodiment, on the first use 600 of the data storage 102, the user may need to establish 604 a use record and/or obtain data before using the data, such as media content. Where the data includes interactive features, such as a game, it is noted that the present invention may be directed for wagering games in which the use record stores credits that are backed by money, or for entertainment games in which the use record stores credits that are fictional, i.e. not backed by money. Where the credits are fictional, use record stored at the data storage 102 may be pre-loaded with credits or may be enabled to add credits to the use record upon request.

In an optional embodiment, the use record may include a play limit that determines the availability of the data, such as media content. For example, the data may be available for a defined amount of time (including an infinite amount of time), a defined quantity of plays or viewings (including an infinite quantity of plays or viewings), a defined window of time (including an infinite window of time), or the like. For example, a use record could make data available for a twenty-four hour period, two viewings, twelve hours of play, unlimited viewings, unlimited viewings until Jan. 10, 2012, unlimited play until the stored credits are exhausted, or any other play limit.

In an optional embodiment, the play limit may be extended. In an optional embodiment, the play limit may be extended through a financial transaction to purchase additional time, viewings, play, or the like. For example, in one such optional embodiment, the executable controller directs the platform processor 100 to communicate with a server. A user modifies 604 a use record through a transaction with the server, such as by adding time, credits, views, plays, or the like in a transaction that is financial or otherwise. In one optional embodiment, illustrated in FIG. 6, the use record is stored 610 at the data storage 102. In another optional embodiment, illustrated in FIG. 7, the use record may be stored 702 at the server and may optionally be communicated 704 to the data storage 102, memory 104 associated with the platform processor 100, or a combination thereof. For example, a sister of an executable controller may be stored in server memory 304 at a server. The sister of an executable controller may communicate to an executable controller at the data storage 102, bypassing any program instructions executed by the platform processor 100, to directly write to the writable sub-components of the data storage 102.

Referring generally to FIGS. 1-8, where the data storage 102 and/or the server 301 store a use record, placing the data storage 102 in communication with a platform processor 100 may trigger one or more security checks, optionally through the wrap discussed above, to ensure that the use record has not been tampered with. For example, a key or an identifier (both of which may have been generated 606 upon the first use of the data storage as discussed above) may be used to verify that the data storage 102 is authentic and that the data have not been altered since the prior use. In an optional embodiment using a server 301, records stored at the data storage 102 may be checked against records stored at the server 301.

Figure 7:
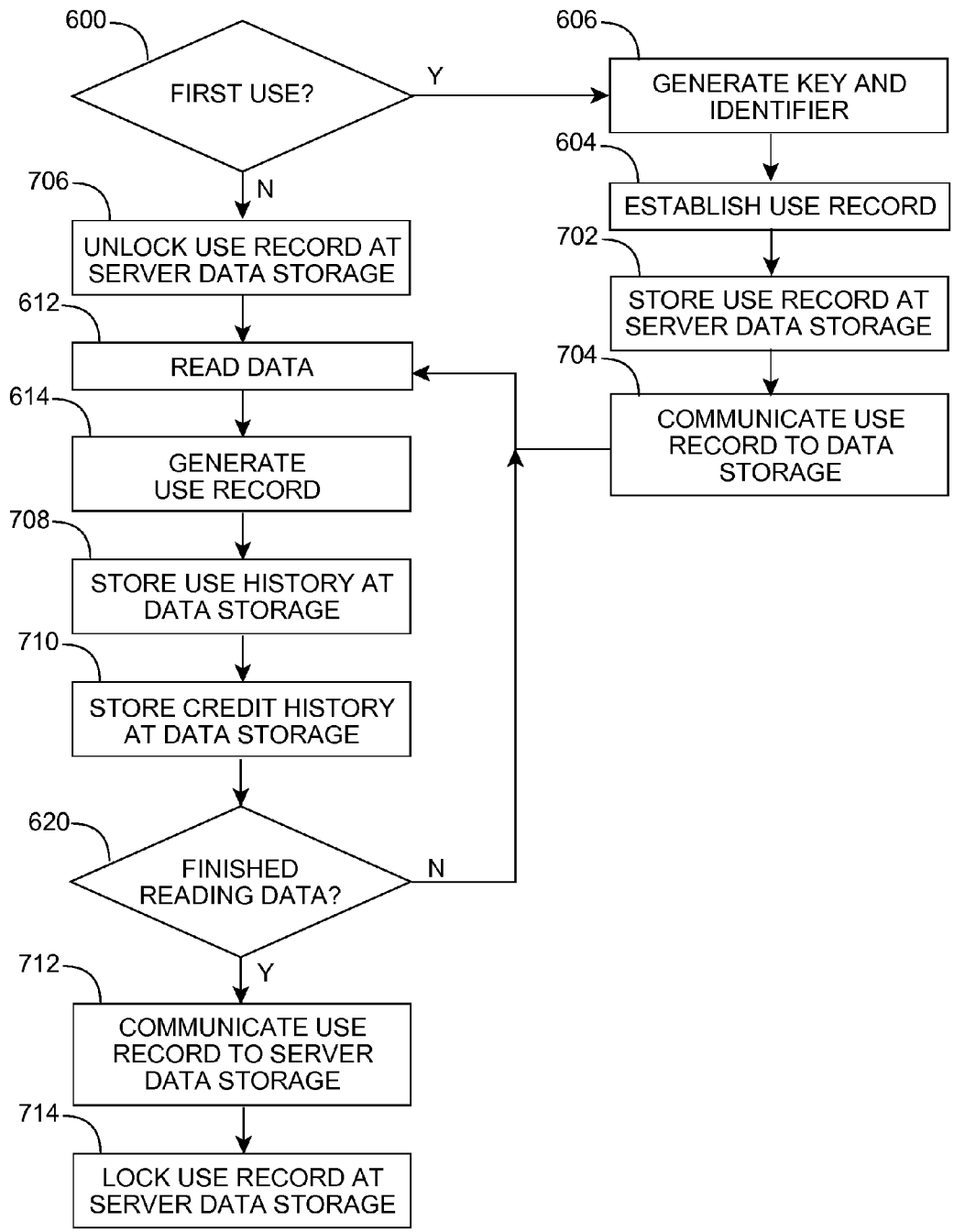
FIG. 7 is a flow chart of a process carried out by a system and device according to an embodiment of the present invention.

As noted above, in an optional embodiment, illustrated in FIG. 7, a use record may be stored at a server 301. Optionally, the use record stored at the server 301 duplicates the use record stored at the data storage 102. For example, in one such optional embodiment, placing the data storage 102 in communication with the platform processor 100 enables the executable controller or sister of the executable controller to "unlock" 706 the use record at the server data storage 302 associated with the data storage 102. Optionally, the use record at the data storage 102 and the server data storage are reconciled 708 so that the use records at both locations match. Continuing with such an optional embodiment, the use record may optionally be temporarily stored 710 at the data storage 102. During play of the data the use record at the data storage 102 may be updated 712 one or more times. At a predetermined time, such as when the data is finished, the record is "locked" 714 until the next game play. In similar fashion, a use record could be stored at memory 104 associated with the platform processor 100, e.g. the use record could be stored, unlocked (either continuously or at discrete points) when the data storage 102 is engaged to the platform processor 100, and locked when the data storage 102 is removed from the platform processor 100.

Figure 6:
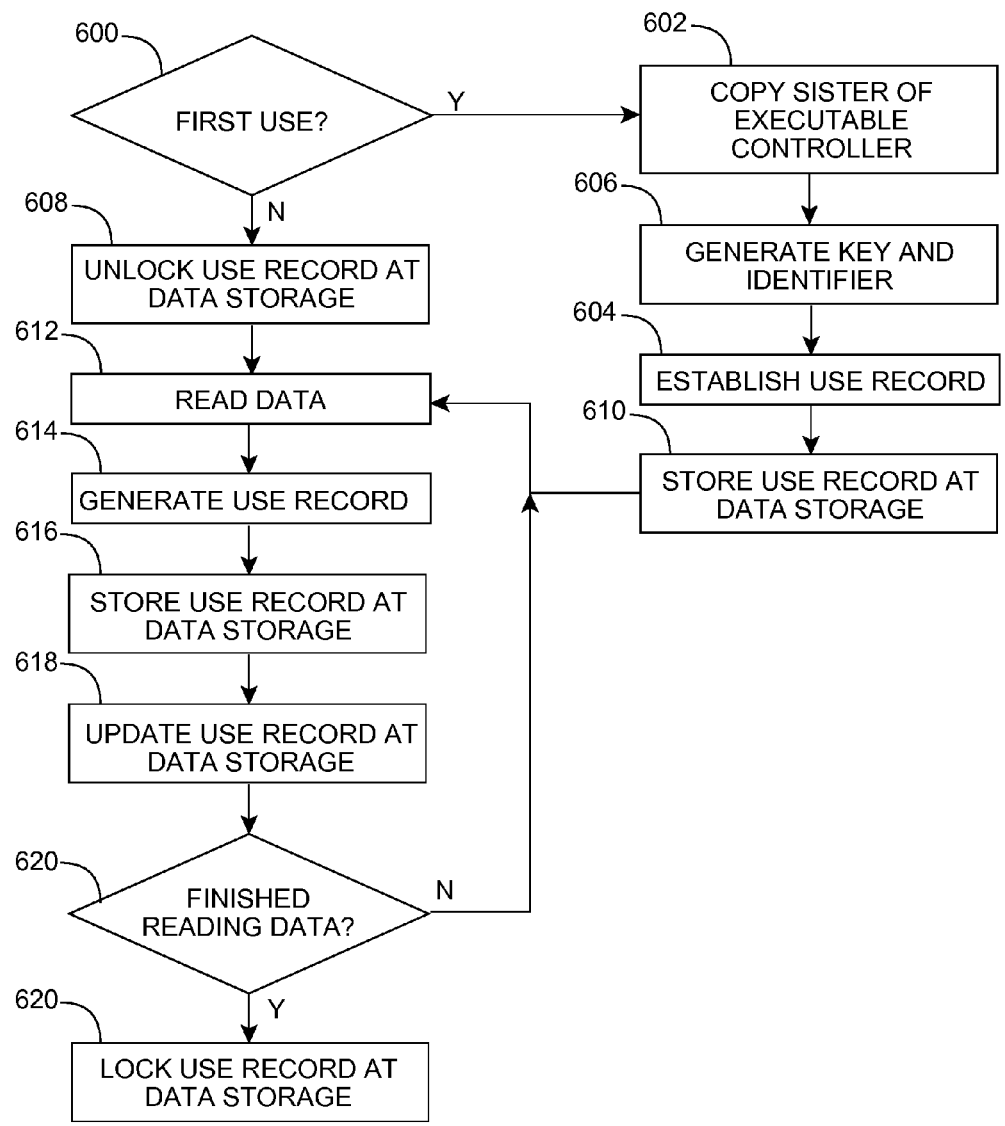
FIG. 6 is a flow chart of a process carried out by a system and device according to an embodiment of the present invention.

In an optional embodiment, illustrated in FIG. 6, the use record is written 610 to the data storage 102, optionally in a writable sub-component 404 of the data storage 102. In a further optional embodiment, the use record and any electronic receipts are encrypted. In one optional embodiment, the use record and/or electronic receipts may be stored at the data storage 102 as well as in at least one additional location, such as a server data storage 302 or a memory 104 associated with the platform processor 100. In another optional embodiment, the use record and/or electronic receipts is stored only at the data storage 102. Optionally, after writing the use record to the data storage 102, the executable controller or the read-write nature of the data storage 102 prevents the alteration or re-writing of the use record. In another optional embodiment, the use record and/or electronic receipts are stored in the wrap and, thus, are secured by the security measures associated with the wrap. In an optional variation on such an embodiment, the executable controller may include some security measure such as a key, identifier, or the like to permit only authenticated transactions and prevent unauthorized viewing, altering, or deleting of the use record and/or electronic receipts.

Referring generally to FIGS. 1-8, the data is read 612 from the data storage 102, optionally by the platform processor 100 at the platform 101. Optionally, the use record (e.g. a time recorded, a play or viewing deducted, credit or credits deducted, or the like) may be updated in real time to reflect that the data is being read. Similarly, an electronic receipt may be generated to record the use/access to the data. It is noted that in an optional embodiment, the wrapped data may represent an account (such as an account identifier, credit card number, or the like) and/or authorization to use an account (such as a key, password, or the like).

In this manner, the wrapped data may be used to conduct a financial transaction. For example, in an optional embodiment, a platform 101 may be a mobile telephone, the data storage 102 may be a memory card or memory chip in the mobile telephone, the memory 104 may be the RAM in the mobile telephone, and the wrapped data may include financial account information and a verification key. The wrapped data may be accessed by the platform processor 100 and transmitted to a payment processor such as a point-of-sale terminal, cash register, payment server, or the like. In an optional embodiment, the wrapped financial data may be transmitted in a secure fashion by (a) passing the data via the executable controller on the memory card to the sister of the executable controller in the RAM of the mobile device; (b) passing the data from the sister of the executable controller in the RAM of the mobile device to a sister of the executable controller in the RAM of the payment processor (e.g., the point-of-sale terminal, cash register, payment server, or the like); and (c) passing the data from the sister of the executable controller in the RAM of the payment processor into the data storage of the receiving device where the financial transaction may be processed. In turn, after the financial transaction is processed, e.g., payment is accepted, the use record may be updated and/or an electronic receipt may be stored at the mobile device by (a) passing updates to the use record and/or electronic receipt via the executable controller in the data storage of the payment processor (e.g., point-of-sale terminal, cash register, payment server, or the like) to the sister of the executable controller in the RAM of the payment processor; (b) passing the data from the sister of the executable controller in the RAM of the payment processor to a sister of the executable controller in the RAM of the mobile device; and (c) passing the data from the sister of the executable controller in the RAM of the mobile device into the data storage of the mobile device where the use record may be updated and electronic receipt stored, optionally secured by the wrap. After updating, the use record may be "locked" and after storing the electronic receipt inside the wrap, the wrap may be "closed."

Where the data includes a game, the outcome of the game may depend, at least in part, on one or more random numbers generated by the platform processor 100 or server processor 300. In an optional embodiment, a random number generator may be included in the executable controller stored at the data storage 102 and/or a sister of the executable controller stored in memory 104 at the platform 101 or stored in server memory 304 at the server 301. In one such embodiment, the consequence is that the random number generator through which the outcome is determined is stored separately from the game of chance itself. In such an embodiment, the random number generator and/or the game of chance may be compatible only with certain games of chance or random number generators, respectively, for security and accounting reasons.

In an optional embodiment in which the data includes a game, the outcome of the game of chance results in a win, loss, or, in some optional embodiments, a push. In a wagering game, the wager is resolved; this may include the awarding of credits for a win, collecting the wager for a loss, and returning the wager for a push. The use record may be updated 618 in any manner, including periodic, real time, or any other fashion. In one optional embodiment, the use record may be updated with each outcome. In another optional embodiment, the use record is "locked" from alteration or re-writing; in such an optional embodiment, a temporary use record may be maintained as credits are awarded and collected during game play and this temporary use record is stored in a use record. In yet another optional embodiment, the use record is updated at a predetermined point, such as at the end of a gaming session.

For example, in an optional embodiment in which the data includes a game as illustrated in FIG. 7, the use record is stored at a server data storage 302 in a record associated with the data storage 102. As noted above, the association between the record and the data storage 102 may be on the basis of a randomly generated identifier. During game play, the credits lost or won during the game of chance are tracked by the executable controller and/or sister of an executable controller and may be temporarily stored 710 at the data storage. At the end of game play, the new use record is communicated 712 to the server data storage 302. At the next game session, play is initiated with the new use record. It is noted that the step of communicating the use record could take many different forms. For example, the platform processor 100 may extract the use record from the data storage 102 and transmit the use record to the server 301 or, in an alternate optional embodiment, the server 301 may extract the use record from the data storage 102, bypassing the platform processor 100.

Referring generally to FIGS. 1-8, in an optional embodiment, as the data is played or viewed, a use record may be generated 614. As an example, the use record may include data such as the time and date the data was read from the data storage 102, the duration that the data was read from the data storage 102, the quantity of times the data was read from the data storage, or the like. Optionally, as illustrated in FIG. 6, this use record is written 616 to the data storage 102. In a further optional embodiment, illustrated in FIG. 7, in which the system includes a server 301, the use record may be communicated 712 to the server 301. The communication of the use record to the server 301 may take place in real time, periodically, upon demand, or on any other basis. For example, in one optional embodiment, the use record is communicated 712 to the server 301 when the data is finished.

Referring generally to FIGS. 1-8, in an optional embodiment, the player may signal that the data is finished; in one example, the user may actuate an "exit" or "disconnect" button. In an optional embodiment in which a use record is stored on the data storage 102, the signal of the end of game play 620 may cause the executable controller and/or sister of the executable controller to finally update the use record and "lock" 620 the use record and/or the data from being altered or rewritten until the data storage 102 is again engaged to a platform processor 100 and the executable controller and/or sister of the executable controller unlock 608 the data storage 102. As noted above, the executable controller stored at the data storage 102 may also communicate with executable sensors in the form of software or firmware to determine whether the data storage 102 is connected to the platform and, upon disconnection from the platform, lock the data and/or the use record. Optionally, sensors may lock the media content and/or use record even if the programs instructions fail to receive an "exit" or "disconnect" command. As noted above, in an optional embodiment, the data storage 102 may include a power source, such as a battery backup, which permits the executable controller and/or sister of the executable controller to write a final update in the event that the data storage 102 is disconnected from the platform 101 or loses power from the platform 101. In one such optional embodiment, the final update also includes the state of the data used by the platform so that the data may be resumed uninterrupted when the data storage 102 is reconnected or power is restored. For example, where the data is streamed (e.g., a movie, song, or the like), the final update may include the exact place where the streaming was interrupted. Where the data includes a game program, the final update may include the game state, including the random number generator seed, at the time the game was interrupted.

In an optional embodiment, such as that illustrated in FIG. 7, in which a server data storage 302 stores use record and/or use record, the end of the data (whether signaled by the user or otherwise detected) may trigger the communication 712 of the use record to the server data storage 302. Optionally, the use record may be locked 714 at the server data storage 302 from being altered or rewritten until the data storage 102 is engaged to a platform processor 100 and an executable controller notifies the server data storage 302 that the associated data storage 102 is engaged and that the use record may be unlocked 706.

Example embodiments are now described in greater detail. These embodiments should be construed as exemplary only and their description herein should not be interpreted as limiting the alternative embodiments described above or recited in the claims presented.

In one example embodiment, the data storage 102 is a removable flash memory connectable to a platform 101 through a USB port or data card slot. The wrap on the data storage 102 is partitioned into at least three sub-components with one sub-component storing data, one sub-component storing an executable controller or an installer for installing an executable controller (depending on the optional embodiment), and one sub-component containing writable storage.

When the data storage 102 is engaged to a platform 101, the platform processor 100 executes the executable controller, or executes the installer to install the executable controller or a sister of the executable controller in a memory 104 associated with the platform processor 100. In an optional embodiment in which the executable controller is executed from the data storage 102, the executable controller may be executed without installing anything at the memory 104 associated with the platform processor 100. In another optional embodiment in which the executable controller is executed from the data storage 102, the executable controller may be executed while temporarily borrowing memory 104 associated with the platform processor 100 for a sister of the executable controller. Under the direction of the executable controller and optional sister of the executable controller, the platform processor 100 optionally assigns a random identifier to the data storage 102 and generates a key, optionally encrypted, and stores the key on the data storage 102 and in memory 104 at the platform 101.

The platform processor 100 accesses a use record at the data storage 102 via the sister of the executable controller and executable controller. In one such optional embodiment, the use record is created by the platform processor 100. In another optional embodiment, the use record is created and stored on the data storage 102 when the wrap is created. In an optional embodiment, a use record is created by establishing a communication link between the platform and a server and conducting a financial transaction. The use record is stored on the data storage 102 and the executable controller may optionally prevent access to alter or rewrite the use record.

The data is read by the platform processor 100 through the executable controller and optional sister of the executable controller. Optionally, the platform processor 100 plays or displays the data to the user with a media player or viewer separate from the executable controller stored at the data storage 102. For example, in an optional embodiment, data may be read from the data storage 102 and played or viewed using a media player or viewer installed at (and executed from) the platform 101. As the data is read from the data storage 102, the platform processor 100 generates and updates a use record that is stored at the data storage 102. In an optional embodiment, data is read directly from the data storage 102 without storing the data at the memory 104 associated with the platform processor 100.

To adjust the play limit stored in a use record, e.g. to purchase additional views or plays of the data the data storage 102 is engaged to a computer platform. This may or may not be the same platform 101 used to conduct the game of chance. For example, in an optional embodiment, a user may change the play limits for data at a kiosk. Optionally, the kiosk may also be used to add new data to the data storage 102. In one such optional embodiment, the executable controller may direct communication with the kiosk. The kiosk may be a standalone device that has authority to add data alter play limits, or the like, or the kiosk may function as a gateway to a server or other device. Optionally, the executable controller, sister of the executable controller, and/or sensors may conduct integrity checks on the use record to attempt to detect alterations or tampering with the data. The kiosk (or server) verifies the use record and, if the use record is verified, the player is enabled to add to the play limit stored at the use record, optionally in exchange for payment, or the like. After the transaction, the use record is updated at the data storage 102 by the kiosk (directly or under the direction of a server).

In an alternate optional embodiment, the data storage 102 may use the platform 101 to conduct such transactions. For example, in an optional embodiment in which the platform 101 is in the form of a cellular telephone, personal computer, or the like, the platform 101 may be able to directly communicate with a server. In one such optional embodiment, the platform 101 may communicate with a server to verify the use record, adjust play limits, download data or the like.

In another example embodiment, the data storage 102 is a flash memory connectable to a platform 101 through a USB port, data card slot, or the like, or a hard drive or other drive connected through an interface with the motherboard of the platform 101. The wrap on the data storage 102 stores data and includes a sub-component 404 with writable storage. In this optional embodiment, executable controller is stored at a server 301 in communication with the platform processor 100.

When the wrap on the data storage 102 is mounted at a platform 101, an "autorun" stored on a data storage 102 may include executable instructions to run sensors from the memory 104 of the platform 101. The sensors may be copied from a server 301 or the data storage 102. If the sensors deem the platform 101 to be safe, i.e., no anomalies are sensed, the "autorun" may executable instructions that authorize a server 301 to copy a sister of an executable controller to memory 104, such as RAM, associated with the platform processor 100. Alternatively, an "autorun" may cause a sister of an executable controller to be installed from the data storage 102 into the memory 104, such as RAM, associated with the platform processor. The platform processor 100 executes the sister of the executable controller from the memory 104 and the executable controller from the data storage 102. Once the sister of the executable controller establishes a connection with the executable controller on the data storage 102, the data storage 102 is readable by the platform 101 and/or server 301 via the cooperation between the executable controller stored on, and executed from, the data storage 102 and a sister of the executable controller stored on, and executed from, memory 104 at the platform 101.

In another such optional embodiment, the executable controller may cooperate with a sister of the executable controller in server memory 304 at a server 301 communicating with the platform 101. Optionally, a sister of the executable controller may be copied to server memory 304 from server data storage 302 or, alternatively, from the data storage 102 connected to the platform 101 communicating with the server 301. It is contemplated that the sister of the executable controller may be copied to, and executed from, server memory 304 in response to running an "autorun" associated with the wrap stored on a data storage 102 at a platform 101. Likewise, a sister of the executable controller may be removed by a server processor 300 upon detection of an anomaly by executable sensors (described in greater detail above) or may persist in the server memory 304 independent of the executable sensors. That is, in one optional embodiment, when the executable sensors detect an anomaly, a sister of the executable controller may be removed from server memory 304 and the data storage 102 secured. In an alternate optional embodiment, an anomaly may merely result in the data storage 102 being secured.

In an optional embodiment, the executable controller may be executed without storing anything at the memory 104, or by temporarily borrowing memory 104 at a platform 101 for a sister of the executable controller. Under the direction of the executable controller and optional sister of the executable controller, the platform processor 100 and/or server processor 300 assigns a random identifier to the data storage 102 and generates a key, optionally encrypted, and stores the key on the data storage 102 and in memory 104 associated with a platform processor 100 and/or server memory 304 (and/or server data storage 302) associated with a server processor 300.

In one optional embodiment, the platform processor 100 establishes a use record, such as by communicating with a server 301 and conducting a financial transaction. In another optional embodiment, the server processor 300 establishes a use record, such as by conducting a financial transaction. The use record is stored in a record on the server 301 (such as at server data storage 302), associated with the data storage 102, and stored at the data storage 102. Optionally, the use record at the data storage 102 is treated as a backup and stores a limited number of transactions, such as the most recent transactions, while the use record stored on the server 301 stores all transactions. In such an optional embodiment, it is contemplated that the use record may be updated in batches or in real-time, i.e., changes or updates to the use record made at either the server 301 or the platform 101 may be propagated in real time to the other via the sister of the executable controller in the server memory 304 at the server 301 communicating with the sister of the executable controller in the memory of the platform 101.

The wrapped data are read by the platform processor 100. As the data, executable game program, or the like, are read, the platform processor 100 generates and updates a use record that is stored at the data storage 102 and the server data storage 302. Optionally, the record is updated in real time. As suggested above, in an optional embodiment, the use record stored at the data storage 102 may be truncated with, for example, old transactions deleted as new transactions are recorded. In this respect, the data storage 102 or at least the sub-component of the data storage 102 storing the use record may be readable and writable.

To adjust the use record, e.g. to purchase additional plays or views of the data the data storage 102 may be engaged to a computer platform. This may or may not be the same platform 101 used to read wrapped data from the data storage 102, e.g., play media content, execute game programs, and so forth. In one such optional embodiment, the executable controller communicates the identifier associated with the wrap on the data storage 102 (and optionally a key associated with the data storage 102) to a server 301. The server 301 verifies the use record in the wrap at the data storage 102 against the use record at the server 301 and, if the use record is verified, the player is enabled to change the play limits stored in the use record, add data or the like. After the credit transaction, the updated use record is stored at the server 301 in a record associated with the data storage 102.

Figure 8:
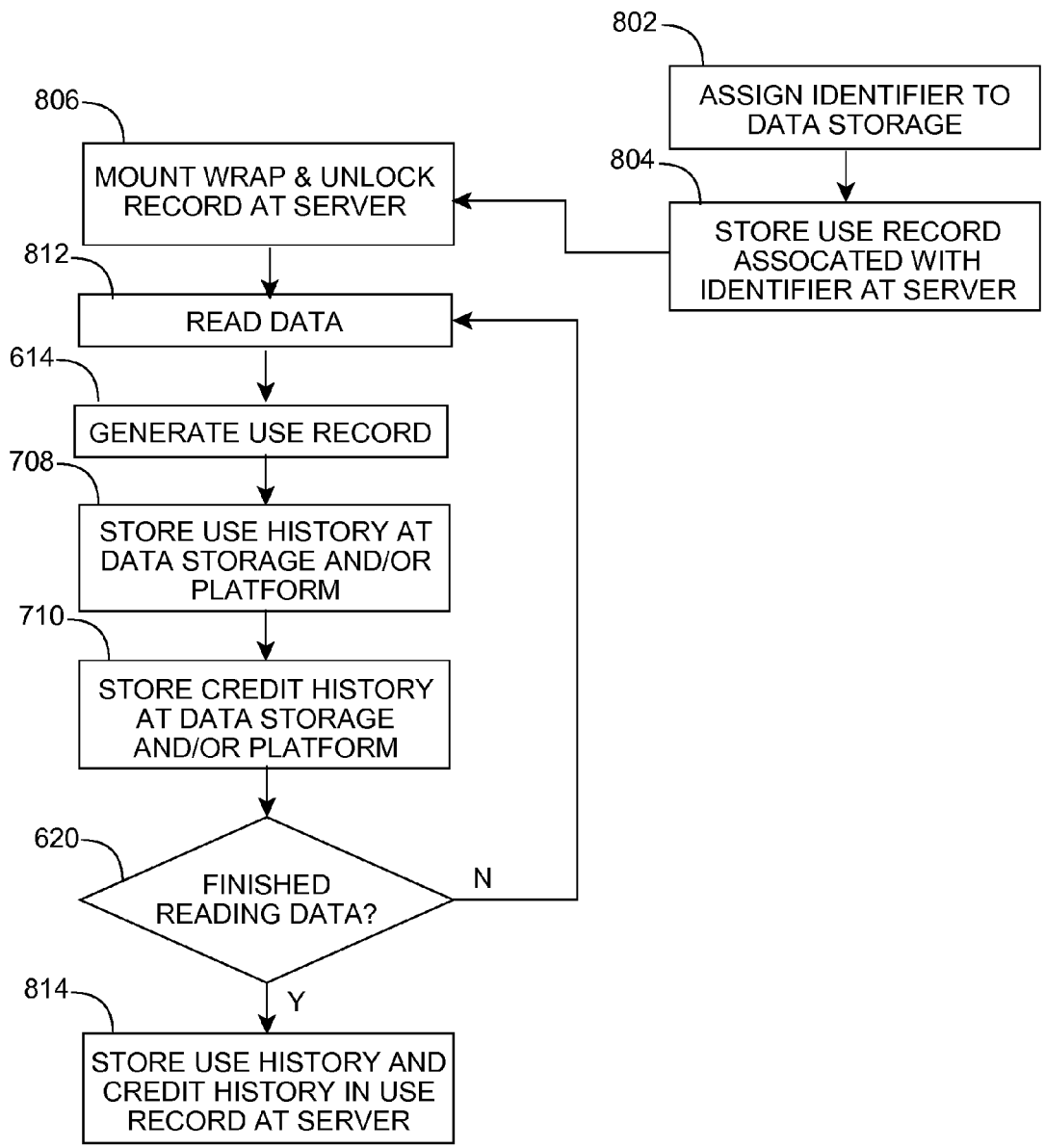
FIG. 8 is a flow chart of a process carried out by a system and device according to an embodiment of the present invention.

In yet another example embodiment, illustrated in FIG. 8, the data storage 102 may store wrapped data but does not store an executable controller or an installer. The data storage 102 is assigned 802 a unique identifier that is associated with a record stored 804 at the server data storage 302 associated with the server 301. The record associated with the unique identifier may optionally include a use record (optionally including play limits and the like). The use record may include separate play limits for each unit of data and/or play limits applicable to all data, such as media content.

The data storage 102 is connected 806 to the platform 101, either in a fixed or removable manner, such as through a USB port, card slot, or the like. The platform 101 already stores the executable controller in memory 104 associated with the platform 101. Alternatively, the platform 101 communicates with a server 301 that stores an executable controller or sister of the executable controller in server memory 304 associated with the server 301. In yet a further optional embodiment, a sister of the executable controller is copied from the server 301 to memory 104 at the platform 101. Optionally, the platform 101 is configured for use with the data storage 102 such as through security procedures that allow the platform 101 to verify the data storage 102 and the data storage 102 to verify the platform 101. The platform 101 communicates with a server 301 through a network, such as a local area network ("LAN"), wireless connection, or the like, that allows the server 301 to communicate directly or through the platform 101 with the data storage 102.

In this example embodiment, by mounting 806 the data storage 102 at the platform 101, the data storage 102 enables the transfer of data (such as a use record) from the server 301 to the platform 101, or otherwise unlocks the record stored at the server 301. The wrapped data is read 812.

In an optional embodiment in which the use record includes a use history and a credit history, the use history is generated 614 and stored 708, at least temporarily, at the data storage 102 and/or at the platform 101. Similarly, the credit history may be tracked and stored 710, at least temporarily, at the data storage 102 and/or the platform 101. Optionally, electronic receipts may be generated as credits are purchased, used, wagered, or otherwise transacted. The use record, e.g., use history and credit history as well as any electronic receipts, are transferred 814 to the server 301 at a predetermined point, such as when the data is finished 620 or the data storage 102 is disconnected from the platform 101. Optionally, a portion or all of the data transferred to the server 301 are backed up at the platform 101 and/or the data storage 102.

In yet another optional example, the data storage 102 is connected to the platform 101 which communicates with a server 301 and the "autorun" prepares the platform 101. An installer in the wrap copies a sister of the executable controller to server memory 304 associated with the server 301. The executable controller stored on, and executed by the server processor 300 from, the data storage 102 cooperates with the sister of the executable controller stored on, and executed by the server processor 300 from, server memory 304 associated with the server 301. In such an optional embodiment, the platform 101 serves primarily as a display device and input device, e.g., a dumb platform 101. In an optional embodiment in which the data is an executable game utilizing a random number generator, the random number generator may be executed at the server 301 either as a separate routine, or as part of the sister of the executable controller, or as part of the game program extracted from the data storage 102 by the server processor 300.

The data is passed from the data storage 102 to the server processor 300 via the executable controller in cooperation with the sister of the executable controller. Optionally, a use record consisting of a use history and a credit history is stored at the data storage 102 in real time as the data is delivered to the platform 101. Again, to be clear, in this example, the server processor 300 at the server 301 utilize a sister of the executable controller at server memory 304 in cooperation with an executable controller at a data storage 102 to deliver data from the data storage 102 to the platform 101. In one such optional embodiment, the server processor 300 generates a use history and directly passes the use history, via the sister of the executable controller to the executable controller, to the data storage 102, thereby bypassing the platform processor 100 and memory 104 at the platform 101. Again, this may occur in real time. Optionally, the use history may also be stored at server data storage 302. In one such optional embodiment, the use history at the data storage 102 may be erased serially so that the use history at the data storage 102 only stores the most recent transactions and/or events, while the use history at the server data storage 302 stores the complete history.

While certain embodiments of the present invention have been shown and described it is to be understood that the present invention is subject to many modifications and changes without departing from the spirit and scope of the claims presented herein.

We claim:

1. A platform comprising:
a platform processor physically associated, and in communication, with memory; and
a data storage physically separate from said memory and readable by said platform processor, wherein said data storage is adapted to store, in non-volatile storage, an executable wrap securing data, an executable controller, and an executable sensor, said wrap including instructions to copy said executable sensor and a sister to said executable controller to said memory, wherein said data is secured in said wrap by said sister of said executable controller in said memory cooperating with said executable controller in said data storage to automatically and continuously permit or deny access by said platform processor to data protected by said wrap such that said data protected by said wrap is only accessible to said platform processor when both said sister of said executable controller in said memory and said executable controller in said data storage are accessible, wherein said platform processor can access only said sister of said executable controller and is prevented by said wrap from accessing said executable controller directly and wherein said executable sensor is adapted to monitor at least one of said platform and said data storage for anomalies and, upon detecting an anomaly, deny access to said data secured by said wrap by said executable sensor deleting said sister of said executable controller from said memory upon detecting an anomaly thereby rendering said wrapped data inaccessible to said platform processor.

2. The platform of claim 1 wherein said platform includes at least one data port and a power supply that supplies power to said platform including said data storage and said platform operates in an operating environment controlled by an operating system that allocates system resources of said platform, wherein said anomalies monitored by said executable sensor include at least one of: a data port open on said platform, the amount of power being delivered to the data storage by said platform, access to system resources used by said executable controller, access to system resources used by said sister of the executable controller, and access to system resources used by said wrap.

3. The platform of claim 1 wherein said sister of said executable controller stores a unique identifier of said platform in said executable controller such that said data protected by said wrap is accessible only to a platform processor associated with a platform with a unique identifier matching the unique identifier stored in said executable controller.

4. The platform of claim 3 further comprising triggering a security check at discrete intervals in which said platform verifies said wrap at said platform by requesting an identifier via said sister of said executable controller in said memory at said platform and receiving an identifier via said sister of said executable controller in said memory.

5. The platform of claim 1 wherein said data includes an electronic receipt that is transmitted by said sister of said executable controller to said executable controller which stores said electronic receipt inside said wrap.

6. A method for storing and delivering data to a platform having a platform processor physically associated, and in communication, with memory, comprising:
providing a data storage readable by said platform processor;
storing an executable wrap in said data storage, said executable wrap protecting data;
storing an executable controller and an executable sensor in said data storage;
installing said executable sensor and a sister of said executable controller at said memory;
executing said sister of said executable controller from said memory by said platform processor, said sister of said executable controller cooperating with said executable controller at said data storage to automatically and continuously permits or denies access by said platform processor to said data protected by said wrap such that said data protected by said wrap is only accessible to said platform processor when both said sister of said executable controller in said memory and said executable controller in said data storage are accessible to said platform processor wherein said platform processor can access only said sister of said executable controller and is prevented by said wrap from accessing said executable controller directly; and
monitoring by said executable sensor of at least one of said platform and said data storage for anomalies and, upon detecting an anomaly, denying access by said executable sensor to said data secured by said wrap by said executable sensor deleting said sister of said executable controller from said memory upon said executable sensor detecting an anomaly thereby rendering said wrapped data inaccessible to said platform processor which can only access said wrapped data through said sister of said executable controller.

7. The method of claim 6 wherein said platform includes at least one data port and a power supply that supplies power to said platform including said data storage and said platform operates in an operating environment controlled by an operating system that allocates system resources of said platform, wherein said step of monitoring by said executable sensor comprises monitoring for at least one of: a data port open on said platform, the amount of power being delivered to the data storage by said platform, access to system resources used by said executable controller, access to system resources used by said sister of the executable controller, and access to system resources used by said wrap.

8. The method of claim 6 further comprising:
storing by said sister of said executable controller of a unique identifier of said platform in said executable controller;
permitting access by said wrap to data protected in said wrap only by a platform processor associated with a platform with a unique identifier matching the unique identifier stored in said executable controller.

9. The method of claim 6 further comprising:
providing a server in communication with said platform, said server having a server processor in communication with server memory;
providing a server data storage readable by said server processor;
storing a second executable wrap and a second executable controller in said server data storage, said second executable wrap protecting data;
installing a sister of said second executable controller at said server memory; and
executing said sister of said second executable controller from said server memory by said server processor, said sister of said second executable controller at said server memory cooperating with said sister of said executable controller at said memory to automatically and continuously permit or deny access by said platform processor to said data protected by said second wrap at said server data storage such that said data protected by said second wrap is only accessible to said platform processor when said sister of said executable controller in said memory is in communication with said sister of said second executable controller in said server memory.

10. The method of claim 9 further comprising triggering a security check at discrete intervals in which said server verifies said wrap at said platform by requesting an identifier via said sister of said second executable controller in said server memory communicating with said sister of said executable controller in said memory at said platform and receiving an identifier via said sister of said executable controller in said memory at said platform communicating with said via said sister of said second executable controller in said server memory.

11. The method of claim 6 further comprising:
providing a server in communication with said platform, said server having a server processor in communication with server memory;
providing a server data storage readable by said server processor;
storing a second executable wrap and a second executable controller in said server data storage, said second executable wrap protecting data;
installing a sister of said second executable controller at said memory; and
executing said sister of said second executable controller from said memory by said platform processor, said sister of said second executable controller at said memory cooperating with said sister of said executable controller at said memory to automatically and continuously permit or deny access by said platform processor to said data protected by said second wrap at said server data storage such that said data protected by said second wrap is only accessible to said platform processor when said sister of said executable controller in said memory is in communication with said sister of said second executable controller in said memory.

12. The method of claim 6 further comprising:
generating an electronic receipt;
transmitting said electronic receipt by said sister of said executable controller to said executable controller; and
storing said electronic receipt inside said wrap by said executable controller.

13. A system comprising:
a platform comprising:
a platform processor physically associated, and in communication, with a memory; and
a data storage physically separate from said memory and readable by said platform processor, wherein said data storage is adapted to store, in non-volatile storage, an executable wrap securing data, an executable controller, and an executable sensor, said wrap including instructions to copy said executable sensor and a sister to said executable controller to said memory, wherein said data is secured in said wrap by said sister of said executable controller in said memory cooperating with said executable controller in said data storage to automatically and continuously permit or deny access by said platform processor to data protected by said wrap such that said data protected by said wrap is only accessible to said platform processor when both said sister of said executable controller in said memory and said executable controller in said data storage are accessible, wherein said platform processor can access only said sister of said executable controller and is prevented by said wrap from accessing said executable controller directly and wherein said executable sensor is adapted to monitor at least one of said platform and said data storage for anomalies and, upon detecting an anomaly, deny access to said data secured by said wrap by said executable sensor deleting said sister of said executable controller from said memory upon detecting an anomaly thereby rendering said wrapped data inaccessible to said platform processor which can only access said wrapped data through said sister of said executable controller; and
a server in communication with said platform comprising:
a server processor physically associated, and in communication, with server memory; and
a server data storage physically separate from said server memory and readable by said server processor, wherein said server data storage is adapted to store, in non-volatile storage, a second executable wrap securing data, wherein said data protected by said second wrap at said server data storage is only accessible to said platform processor by transferring data via said sister of said executable controller in said memory at said platform.

14. The system of claim 13 wherein said second wrap stored at said server data storage further comprises a second executable controller and a second executable sensor, said second wrap including instructions to copy said second executable sensor and a sister to said second executable controller to said server memory, wherein said data is secured in said second wrap by said sister of said second executable controller in said server memory cooperating with said second executable controller in said server data storage to automatically and continuously permit or deny access by said server processor to data protected by said second wrap such that said data protected by said second wrap is only accessible to said server processor when both said sister of said second executable controller in said server memory and said second executable controller in said server data storage are accessible, said second executable sensor adapted to monitor at least one of said server and said server data storage for anomalies and, upon detecting an anomaly, deny access to said data secured by said second wrap, wherein said data protected by said second wrap at said server data storage is only accessible to said platform processor by transferring data via said sister of said second executable controller in said server memory at said server transferring said data to said sister of said executable controller in said memory at said platform.

15. The system of claim 14 wherein said second wrap further includes instructions to trigger a security check at discrete intervals in which said server verifies said wrap at said platform by requesting an identifier via said sister of said second executable controller in said server memory communicating with said sister of said executable controller in said memory at said platform and receiving an identifier via said sister of said executable controller in said memory at said platform communicating with said via said sister of said second executable controller in said server memory.

16. The system of claim 13 wherein said step of denying access to said data secured by said second wrap includes said second executable sensor deleting said sister of said second executable controller from said server memory upon detecting an anomaly.

17. The system of claim 13 wherein said platform includes at least one data port and a power supply that supplies power to said platform including said data storage and said platform operates in an operating environment controlled by an operating system that allocates system resources of said platform, wherein said anomalies monitored by said executable sensor include at least one of: a data port open on said platform, the amount of power being delivered to the data storage by said platform, access to system resources used by said executable controller, access to system resources used by said sister of the executable controller, and access to system resources used by said wrap.

18. The system of claim 13 wherein said server includes at least one data port and a power supply that supplies power to said server including said server data storage and said server operates in an operating environment controlled by an operating system that allocates system resources of said server, wherein said anomalies monitored by said second executable sensor include at least one of: a data port open on said server, the amount of power being delivered to the server data storage by said server, access to system resources used by said second executable controller, access to system resources used by said sister of the second executable controller, and access to system resources used by said second wrap.

19. The system of claim 13 wherein said sister of said executable controller stores a unique identifier of said platform in said executable controller such that said data protected by said wrap is accessible only to a platform processor associated with a platform with a unique identifier matching the unique identifier stored in said executable controller.

20. The system of claim 13 further comprising:
generating an electronic receipt by said server;
storing said electronic receipt within said second wrap;
transmitting said electronic receipt by said sister of said second executable controller to said sister of said executable controller;
transmitted said electronic receipt by said sister of said executable controller to said executable controller; and
storing said electronic receipt inside said wrap by said executable controller.

* * * * *